United States Patent
Chee et al.

[11] Patent Number: 5,877,741
[45] Date of Patent: Mar. 2, 1999

[54] SYSTEM AND METHOD FOR IMPLEMENTING AN OVERLAY PATHWAY

[75] Inventors: Lawrence P. Chee, Vancouver; John David Mulvenna, Delta, both of Canada

[73] Assignee: Seiko Epson Corporation, Tokyo, Japan

[21] Appl. No.: 632,543

[22] Filed: Apr. 19, 1996

Related U.S. Application Data

[63] Continuation-in-part of Ser. No. 486,796, Jun. 7, 1995, Pat. No. 5,694,141.

[51] Int. Cl.⁶ ..................................................... G06F 15/00
[52] U.S. Cl. ........................................... 345/113; 345/114
[58] Field of Search .................... 345/113, 114, 345/132, 523

[56] References Cited

U.S. PATENT DOCUMENTS

| | | | |
|---|---|---|---|
| 4,009,470 | 2/1977 | Danilenko et al. | |
| 4,317,114 | 2/1982 | Walker | 345/113 |
| 4,618,858 | 10/1986 | Belch | 340/724 |
| 4,694,288 | 9/1987 | Harada | 340/721 |
| 4,751,502 | 6/1988 | Ishii et al. | 340/709 |
| 4,760,387 | 7/1988 | Ishii et al. | 340/716 |
| 4,819,189 | 4/1989 | Kikuchi et al. | 364/521 |
| 4,866,524 | 9/1989 | Six | 348/596 |
| 4,907,086 | 3/1990 | Truong | 348/584 |
| 4,933,877 | 6/1990 | Hasebe | 364/521 |
| 4,940,971 | 7/1990 | Hasebe | 340/721 |
| 4,954,970 | 9/1990 | Walker et al. | 345/435 |
| 4,980,678 | 12/1990 | Zenda | 340/716 |
| 5,001,469 | 3/1991 | Pappas et al. | 340/721 |
| 5,043,923 | 8/1991 | Joy et al. | 364/522 |
| 5,047,755 | 9/1991 | Morita et al. | 340/721 |
| 5,091,717 | 2/1992 | Carrie et al. | 340/703 |
| 5,093,798 | 3/1992 | Kita | 345/435 |
| 5,138,305 | 8/1992 | Tomiyasu | 340/717 |
| 5,150,109 | 9/1992 | Berry | 340/811 |
| 5,216,413 | 6/1993 | Seiler et al. | 340/721 |
| 5,222,212 | 6/1993 | Johary et al. | 395/162 |
| 5,293,474 | 3/1994 | Patil et al. | 395/148 |
| 5,293,485 | 3/1994 | Zenda | 395/164 |
| 5,327,156 | 7/1994 | Masukane et al. | 395/113 |
| 5,412,399 | 5/1995 | Hara . | |
| 5,463,422 | 10/1995 | Simpson et al. . | |
| 5,598,525 | 1/1997 | Nally et al. | 395/520 |

FOREIGN PATENT DOCUMENTS

| | | |
|---|---|---|
| 0 513 451 | 11/1992 | European Pat. Off. . |
| 0 610 829 | 8/1994 | European Pat. Off. . |
| 0 675 478 | 10/1995 | European Pat. Off. . |
| WO 96/41325 | 12/1996 | WIPO . |

OTHER PUBLICATIONS

IBM Technical Disclosure Bulletin, vol. 36, No. 4, Apr. 1993, New York US, pp. 189–191, XP000364483 "RAM-DAC Enhancement for Double Buffered Graphics Systems".

*Primary Examiner*—Mark K. Zimmerman
*Assistant Examiner*—Vincent E. Kovalick
*Attorney, Agent, or Firm*—Mark P. Watson

[57] ABSTRACT

A system and method for processing overlay display data. A display FIFO pipeline processes background graphics display data and a separate overlay FIFO pipeline processes overlay display data stored in an off-screen part of a graphics memory. The overlay FIFO pipeline performs format conversion, interpolation and scaling on the overlay display data and outputs it to an overlay mux. The overlay mux selects between the outputs of the display FIFO pipeline and the overlay FIFO pipeline in the processing of each scan line.

15 Claims, 15 Drawing Sheets

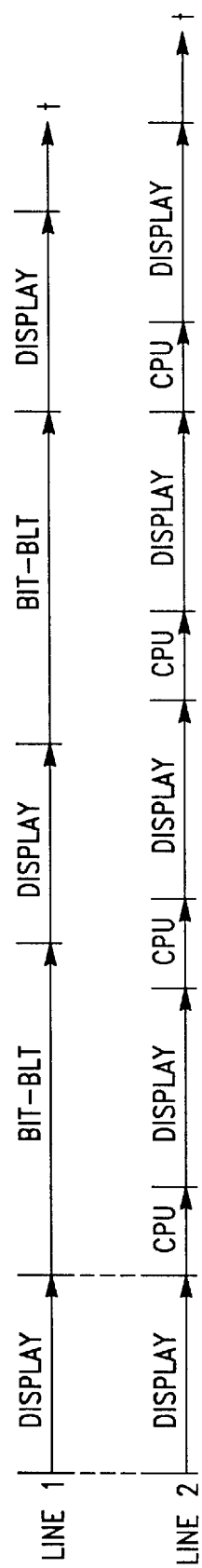
FIG.—1
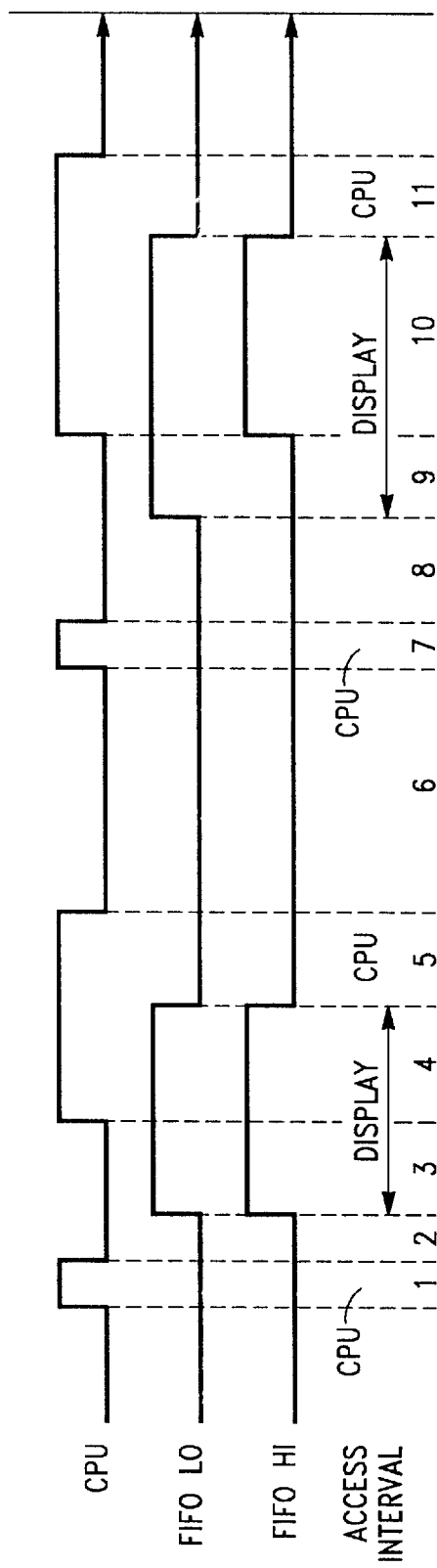
FIG.—2
(PRIOR ART)

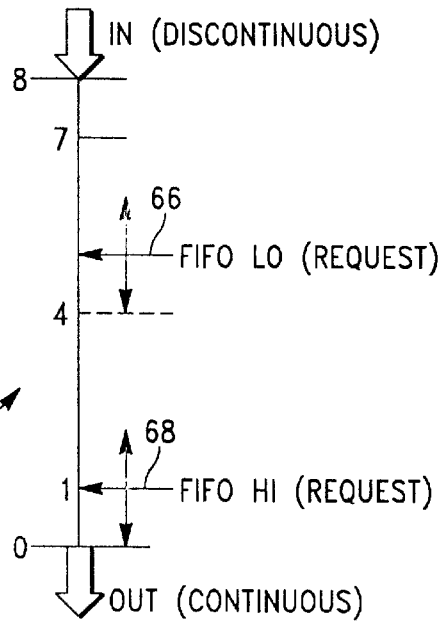
FIG.−6
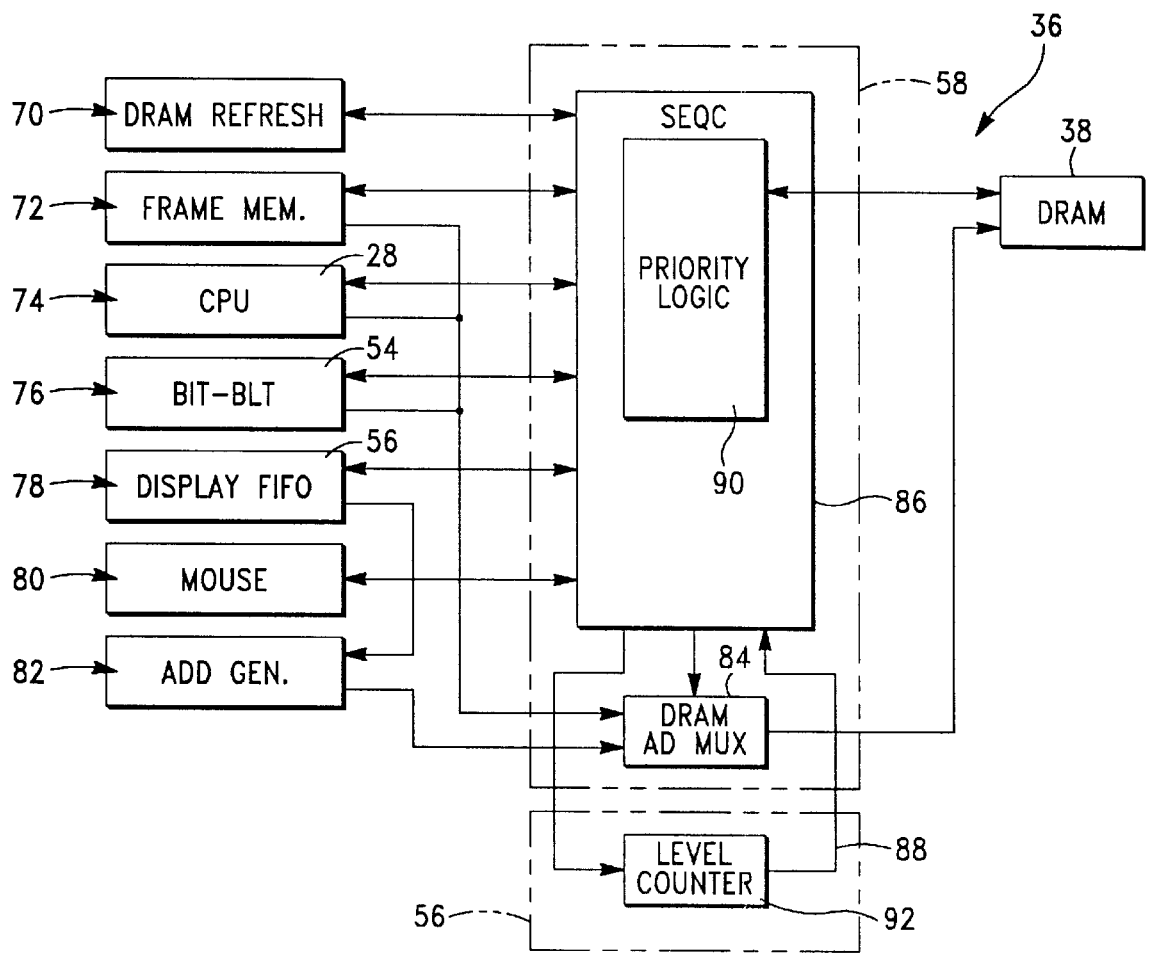
FIG.−7

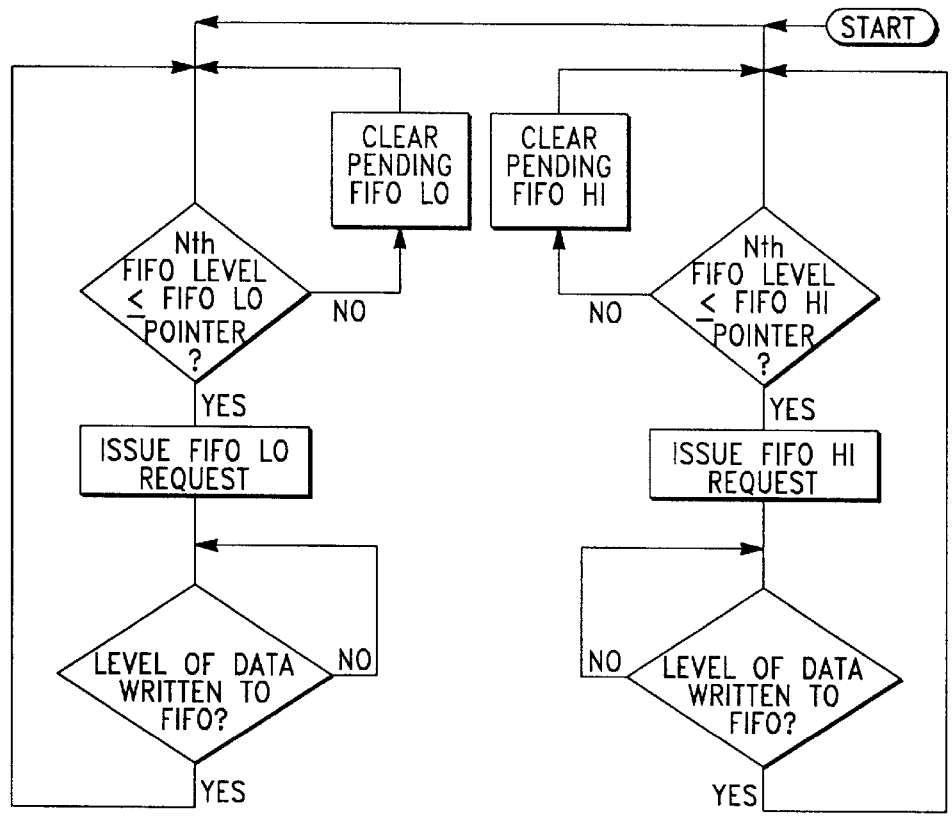

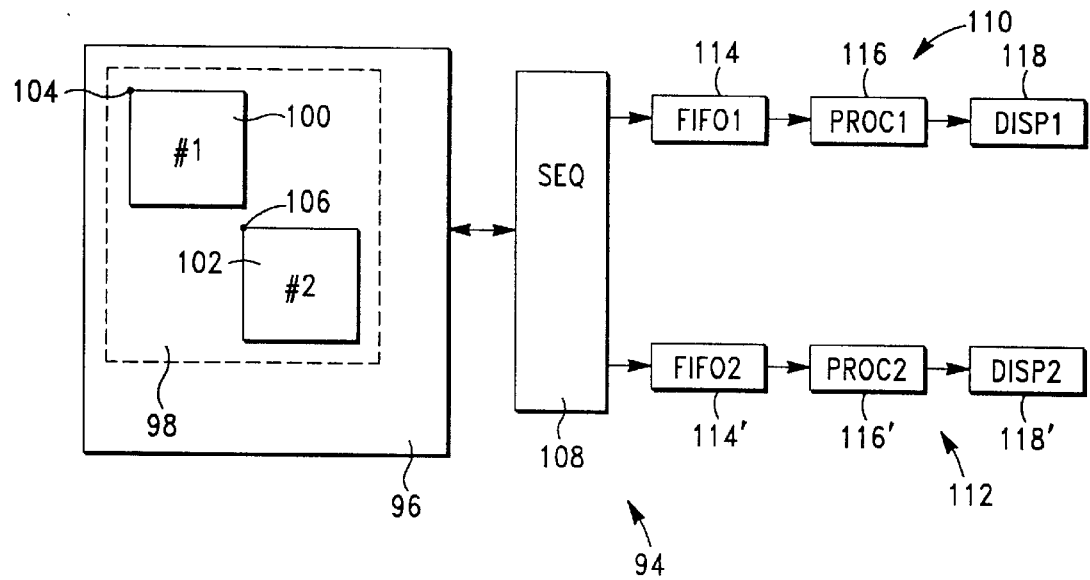
FIG.—13
(PRIOR ART)
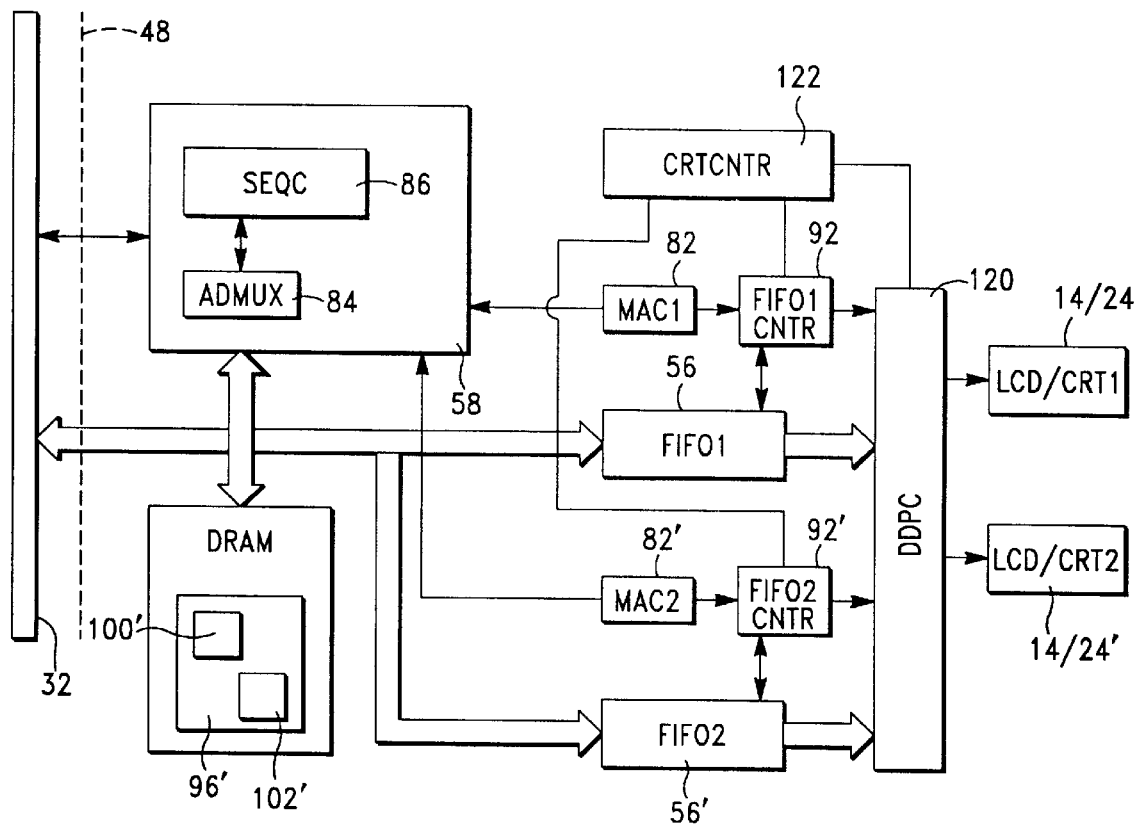
FIG.—14

SYSTEM AND METHOD FOR IMPLEMENTING AN OVERLAY PATHWAY

This is a continuation-in-part of Application entitled "Computer System with Double Simultaneous Displays Showing Differing Display Images", Ser. No. 08/486,796 filed on Jun. 7, 1995, now U.S. Pat. No. 5,694,141.

CROSS REFERENCE TO RELATED APPLICATIONS

The subject matter of the present application is related to subject matter disclosed in U.S. patent application Ser. No. 08/487,121, filed Jun. 7, 1995, entitled "Computer System with Video Display Controller having Power Saving Modes", and to application Ser. No. 08/487,117, filed Jun. 7, 1995, entitled "Computer System with Display", now U.S. Pat. No. 5,767,866, to application Ser. No. 08/485,876, filed Jun. 7, 1995, entitled, "Display FIFO Module Including a Mechanism for Issuing and Removing Requests for DRAM Access", now U.S. Pat. No. 5,673,416, and to application Ser. No. 08/487,120, filed Jun. 7, 1995, entitled, "Computer System with Dual-Panel LCD Display", now U.S. Pat. No. 5,724,063, all filed on the same day and assigned to the same assignee as the present application.

BACKGROUND OF THE INVENTION

1. Field of the Invention

The present invention relates generally to graphics systems, and more specifically, the present invention is directed toward the processing of graphics overlays.

2. Related Art

A conventional bus arbitrating circuit is known in accord with U.S. Pat. No. 4,453,214 (hereinafter, the '214 patent), issued 5 Jun. 1984 to Ralph L. Adcock. According to the '214 patent, a bus arbitrator and memory manager (BAMM) establishes a priority among competing operating units of a computer system. The BAMM sorts requests for access to the memory according to a priority, and allows the device with the highest priority access ahead of the other devices. It appears that once a device is allowed access to the memory, an interrupt of this access is not allowed when a request for access from another device with a higher priority is received by the BAMM of the '214 patent. When a device which has had memory access is finished with this access, it provides a "sign off" signal, thus allowing the BAMM to permit memory access to the device requesting access and having the highest priority.

With a BAMM of the type disclosed by the '214 patent, a display FIFO of a computer system could conceivably be denied access to the DRAM at a time when a display FIFO is nearly or completely out of information for display. Thus, continuity of operation of the display of the computer system could be interrupted. Understandably, this type of display interrupt would be concerning and confusing for a user of the computer system.

Another conventional graphics system with a graphics controller and DRAM controller is known in accord with U.S. Pat. No. 4,991,112 (hereinafter, the '112 patent), issued 5 Feb. 1991 to Jean-Michel Callemyn. According to the '112 patent, a DRAM controller receives refresh requests and requests for access to the DRAM in bursts, and arbitrates among the requests. During a display stage, after a preparatory read, the greatest priority is given to the display FIFO. A read of the DRAM in bursts may be interrupted when the FIFO is full. In this case, priority is given to a possible preparatory read. In the absence of a preparatory read request, a request by the CPU will be honored and access to the DRAM will be effected for the CPU. As soon as the FIFO makes a request for access, however, the CPU access will be interrupted, and the previously interrupted read in bursts for the FIFO with be resumed. During the line return stage, differing priorities are set for access to the DRAM. That is, refreshing the DRAM is given highest priority, followed by filling of the display FIFO. Third in priority is compliance with access requests from the graphics processor, and then assesses for the CPU. However, other than the interrupt described above, the '112 patent is not believed to allow interruption of an access to the DRAM once this access is allowed. Additionally, the interrupt allowed by the '112 patent is an inherent interrupt necessary to prevent data of the FIFO from being overwritten by new data because the FIFO is full.

Yet another conventional DRAM refresh controller with a bus arbitration scheme is known in accord with U.S. Pat. No. 5,345,577 (hereinafter, the '577 patent), issued 6 Sep. 1994, to Tzoyao Chan and Milton Cheung. According to the '577 patent, a cache controller is provided with both burst and hidden refresh modes. Refresh requests are counted but not acted upon by allowing memory access until a certain number of these requests are received. On the other hand, hidden refreshes are done with no hold signal being sent to the CPU while the refresh is done. Until the refresh is completed local memory access but not remote memory access is allowed. Consequently, the CPU is denied memory access during a hidden refresh, but will not expect immediate access to the memory anyway so that the hidden refresh does not interfere with CPU operation. Interruption of memory access once granted does not appear to be a feature of this patent.

Taking general considerations into account, in a graphics controller, such as a VDC generally described above, arbitrating DRAM interface (access) among the several devices of the system is the most critical portion of the controller. Access to the DRAM dictates how and when devices such as the bit-BLT engine, display FIFO, and the local bus (that is, the CPU) have access to the DRAM. Access requests by the CPU and bit-BLT engine are mutually exclusive, and will not occur simultaneously. Ordinarily, whenever access to the DRAM is discontinued for one device and allowed for another device, a new page of the DRAM must be accessed. That is, the DRAM may be visualized as a two-dimensional array of memory locations. This memory uses rows and columns of memory locations (or memory cells) with a row pointer and a column pointer. As long as memory access is made to a single row of the memory, with the column pointer simply moving along the row as data is written to or read from address locations of the row, then a single-page access to the memory is effected, and no page break is necessary. However, when another row (i.e., another page) of the memory must be accessed, a pre-charge sequence must be run in preparation to accessing the next row of memory locations. This pre-charge sequence takes time so that a multiple-page access to the memory is not nearly as efficient as a single-page access in terms of the amount of data written into or read from the memory during the time interval of such a memory access.

Thus, page-mode access to the DRAM is much more efficient in terms of time utilization than is random access to the DRAM because of the many page breaks required for random access. When page-mode is not maintained for the DRAM, then at least one preparatory pre-charge cycle must be conducted to allow access to another different page of the DRAM in addition to the time interval required to write the data to or read the data from the memory cells. When access is allowed to the DRAM for the bit-BLT, these accesses will ordinarily be multi-page accesses which consume considerable time, but a request for this access does not require that immediate access to the DRAM be granted. On the other hand, CPU (local bus) access to the DRAM is usually a single-page access, requires considerably less time than a bit-BLT access, and also does not require that a request result in immediate access. However, when the CPU is required to wait for DRAM access, the system throughput is decreased and the WINMARKS (industry standard performance bench marks) for the computer system also are decreased. Further, the display FIFO of a graphics controller also requests DRAM access, and may be envisioned as a storage tank of water (data) draining at a uniform rate from the bottom, and only occasionally being refilled from the top. The display FIFO stores image information to be sent to the display devices (i.e., to the CRT or LCD, for example). The rate of drainage of the data from the display FIFO depends on the mode of display operation. If the display is being operated in a grey-scale mode which requires four bits per pixel, then the display FIFO will not drain very fast. On the other hand, if the user is operating the display in a color mode, then each pixel of the display may require eight bits, or sixteen bits, or possibly more than sixteen bits of information; and the display FIFO will drain correspondingly faster.

When being refilled, the refilling rate of the display FIFO is much higher than the draining rate. But, refilling may be intermittent and interrupted for the allowance of other activities requiring access to the DRAM. Further, it must be understood that while the FIFO is being refilled, complete doublewords of data must be input from the DRAM. If there is insufficient room at the top of the display FIFO to accept all of the last complete double-word of data being input at a particular time, then some of the existing data will be overwritten and lost. Conventionally, a FIFOLO request (a low priority request for DRAM access) is issued by the display FIFO to the DRAM controller as soon as the display FIFO has room at the top for at least one double-word of new data without overwriting existing data waiting to be sent to the display device.

Consequently, one or more accesses to the DRAM may be granted to the display FIFO in response to the FIFOLO request. This request is not cleared until the FIFO is filled. If the display FIFO is not adequately refilled in response to the FIFOLO request, then as soon as the display FIFO starts to write its last double-word of data to the display a FIFOHI request for access to the DRAM will be issued. This FIFOHI request will be honored immediately. Again, the FIFOHI request will not be cleared until the FIFO is filled completely. Consequently, a conventional DRAM controller will clear both FIFOLO and FIFOHI simultaneously after a FIFOHI request has been issued. Again, these requests for DRAM access would conventionally not be cleared until the FIFO is completely filled with fresh data.

FIG. 1, line 1, depicts a timing diagram showing an idealized sequence of accesses to a DRAM of a VDC alternating between a display FIFO and a bit-BLT engine. Line 2 of this FIG. 1 also shows an idealized sequence of accesses to the DRAM by a display FIFO and the CPU. These idealized timing diagrams show that neither the bit-BLT or CPU is required to wait for DRAM access, that the DRAM has no idle time, and that the accesses granted are relatively long for the bit-BLT so that multi-page accesses can be accomplished. Conventional computer system graphics controllers do not achieve such idealized management of DRAM access.

Moreover, in an actual computer system graphics controller (i.e., a VDC), the sequencing of the requests for access to the DRAM and the accesses to the DRAM actually granted are not idealized. Accordingly, hypothetical FIG. 2 (designated as prior art) depicts a timing diagram as might be experienced in an actual conventional computer system graphics controller. Viewing FIG. 2, the first of the three time lines of this graph respectively shows requests for access to the DRAM from the CPU. The next two lines show access requests from the display FIFO: first on a low priority basis (FIFOLO)—indicating that the display FIFO is sufficiently depleted of display information that at least one double-word of new information can be written to this FIFO without overwriting existing data; and secondly, on a high priority basis (FIFOHI)—indicating that the display FIFO is using its last double-word of information and is at risk of running out of information to be provided to the user by means of the display device (i.e., the CRT or LCD, for example). These FIFOLO and FIFOHI requests are not cleared (i.e., removed or discontinued) until the display FIFO is granted DRAM access and the FIFO is completely filled with data. In this conventional graphics controller, access to the DRAM at the highest priority is allowed to a display FIFOHI request, even interrupting an access already granted to the CPU or to another device of the computer system.

Considering FIG. 2, during interval #1, the CPU is granted DRAM access and signs off. During interval #2, the DRAM is idle. The beginning of interval #3 indicates the start up of the display graphics process with the display FIFO empty, and the simultaneous issuance of a FIFOLO and FIFOHI request. The FIFOHI request is honored, but these requests (FIFOLO and FIFOHI) are not cleared until the display FIFO is completely filled with data. As a result, the beginning of interval #4 indicates a request from the CPU for DRAM access which will not be honored until the FIFOHI request is cleared. Interval #4 indicates waiting time for the CPU. The end of interval #4 indicates the simultaneous clearing of both FIFOLO and FIFOHI, and the beginning of interval #5 during which the CPU is finally granted DRAM access. Interval #9 indicates the issuance of a FIFOLO request from the display FIFO for DRAM access. Because insufficient data is provided to the display FIFO in response to the FIFOLO request (another device, such as the bit-BLT, for example, may be making DRAM access so that the FIFOLO request in not sufficiently honored), the display FIFO issues a FIFOHI request at the beginning of interval #10. This FIFOHI request is honored immediately during interval #10. However, another interval (interval #10) results during which the CPU is denied access to the DRAM. At the end of interval #10 the FIFOLO and FIFOHI requests are both cleared simultaneously, and the CPU is granted DRAM access.

Moreover, FIG. 2 shows that the conventional arbitration scheme results in the DRAM sometimes being idle (intervals 2, 6, and 8), and in either the CPU or display FIFO waiting for access to the DRAM (intervals 4, 9, and 10). Once a FIFOHI request is made, the CPU is be required to wait until the display FIFO is completely filled before access to the DRAM can be granted to the CPU, even though the display FIFO may have received enough data that there in no longer an immediate risk of its running out of data for the displays. This conventional graphics controller both fails to maintain page mode for the DRAM, and also decreases the throughput rate for the computer system.

Accordingly, a long-felt need has been recognized for a more efficient and effective way of arbitrating access to the DRAM of a graphics controller.

Further, a conventional display controller is known in accord with U.S. Pat. No. 5,138,305 (hereinafter, the '305 patent), issued 11 Aug. 1992 to Yuichi Tomiyasu. It is believed that the '305 patent teaches a display controller which will drive a LCD using VGA format signals intended for a CRT. The '305 patent does not appear to relate to simultaneously driving double displays, each with a different image.

Another conventional VGA controller card is known in accord with U.S. Pat. No. 5,150,109 (hereinafter, the '109 patent), issued 22 Sep. 1992 to Wayne F. Berry. The '109 patent is believed to disclose a bus-mountable VGA controller card for IBM compatible computers, which will allow driving of a LCD, or of a CRT, or of the LCD and CRT simultaneously. However, both display devices will show the same image. The '109 patent is not believed to relate to the driving of two display devices simultaneously, with each display device showing a different image.

Still another conventional system for raster imaging with automatic centering and image compression is known in accord with U.S. Pat. No. 5,293,474 (hereinafter, the '474 patent), issued 8 Mar. 1994 to Subas S. Patil, et.al. The '474 patent is believed to relate to a video display control system in which horizontal or vertical centering, or both, of an image as presented on a display, as well as image compression to fit a display size, without using a memory frame buffer. The '474 patent is not believed to relate to driving double displays simultaneously, with each display having a different image.

SUMMARY OF THE INVENTION

The present invention identifies a graphics controller that includes two pipelines individually dedicated to background graphics display data and overlay display data. Overlay display data is stored by one or more sources in an off-screen part of a graphics memory. Since the overlay display data is stored in a format native to the originating source, CPU functions associated with format conversion, scaling, interpolation, and border shaping are thereby eliminated. Additionally, associated local bus traffic between the CPU and the graphics memory is eliminated.

To compensate for this processing change, an overlay FIFO pipeline within a graphics controller is dedicated to the processing of overlay display data. This overlay FIFO pipeline retrieves the overlay display data from the off-screen part of the graphics memory and performs any necessary format conversion, interpolation, scaling, etc. Processed overlay display data is sent to an overlay mux that selects between the processed overlay display data and background graphics data from a display FIFO pipeline.

In providing a hardware solution to multiple overlays, the graphics controller assigns a set of registers to each overlay. These registers identify the position of the overlay, the unscaled size of the overlay, the scale factor, the address of the overlay data in memory, a native format, and an enable bit. Assignment of these register sets based on the predetermined position of the overlay on the display can define the order in which overlay data is to be read and processed by the overlay FIFO pipeline. Additionally, use of the enable bit to define complementary overlay memory areas permits the graphics controller to process double buffered overlay display data. Finally, priority logic within the graphics controller arbitrates memory access requests to the graphics memory using a tiered approach. This tiered approach allows upper tier memory access requests to interrupt existing lower tier memory access requests, thereby improving the system throughput.

BRIEF DESCRIPTION OF THE FIGURES

The foregoing and other features and advantages of the invention will be apparent from the following, more particular description of a preferred embodiment of the invention, as illustrated in the accompanying drawings. In the drawings, like reference numbers indicate identical or functionally similar elements. Additionally, the left-most digit of a reference number identifies the drawing in which the reference number first appears.

FIG. 1 provides a graphical representation of idealized accesses to a dynamic random access memory by a bit block transfer (bit-BLT) engine and by a central processing unit (CPU).

FIG. 2 presents a hypothetical timing diagram which may be experienced in a prior art computer system having a conventional graphics controller.

FIG. 6 is a graphical representation of a first-in-first-out display memory of the computer system seen in preceding Figures;

FIG. 7 is a schematic functional block diagram of a sequencer and controller (SEQC) of the present computer system;

FIG. 8 provides a tabulation of a two-tiered prioritized arbitration scheme implemented for allowing access to a DRAM of the present computer system;

FIG. 9 provides two simultaneously running flow charts implemented by the display FIFO of the present invention in arbitrating access to the DRAM;

FIG. 10 provides a tabulation of a three-tiered prioritized arbitration scheme implemented for allowing access to a DRAM of an alternative embodiment of the present computer system;

FIG. 13 is a functional block diagram of a conventional computer system having the ability to drive two display devices displaying differing images, and having separate processing channels for image information from a DRAM of the computer system to the display devices;

FIG. 14 provides a functional block diagram of a portion of the VDC of a computer system embodying the present invention;

DETAILED DESCRIPTION OF THE PREFERRED EMBODIMENTS

Figure 3:
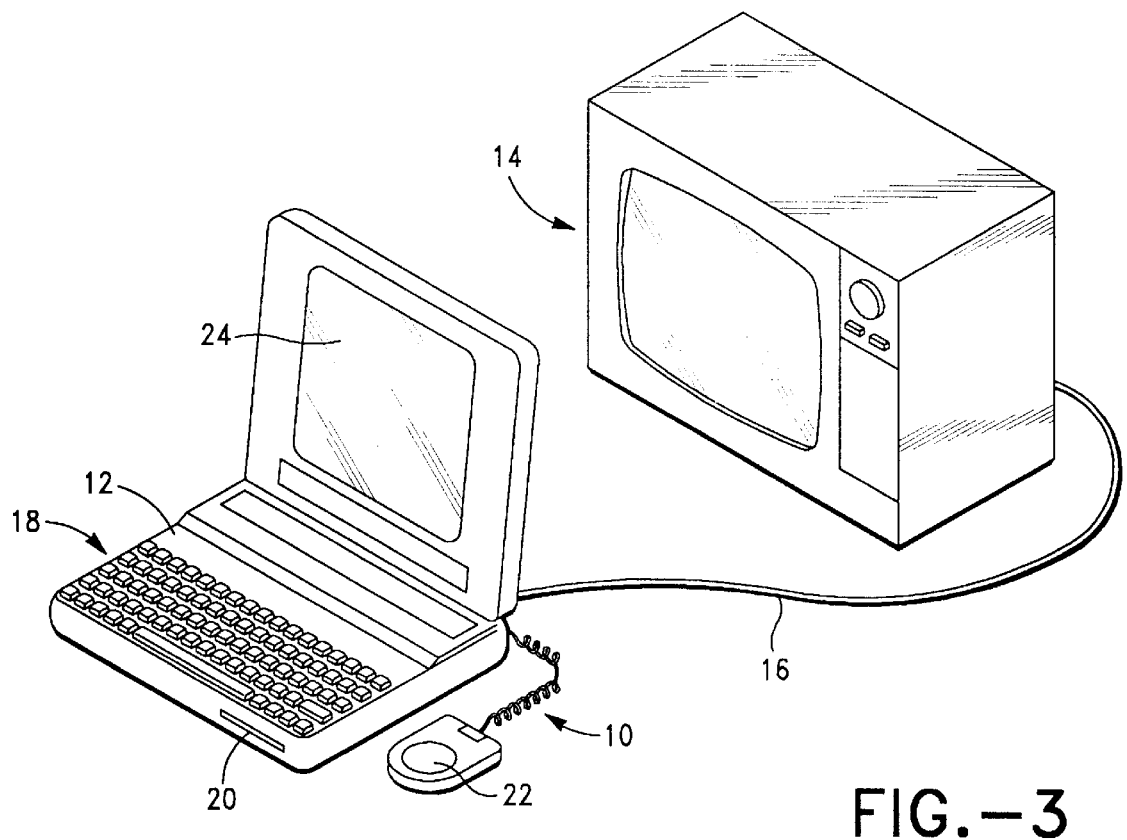
FIG. 3 provides a pictorial presentation of a computer system, including a notebook type computer having a LCD display to display a first image, and also a television which being used as a display device for the computer system 10 to display a different second image.

Viewing FIG. 3, a computer system 10 includes a notebook computer 12, and an additional display device 14 interfaced with the notebook computer 12 via a cable 16. The additional display device 14 is illustrated as a conventional television. Those ordinarily skilled in the pertinent arts will recognize that the television accepts signals in NTSC format and displays an interlaced image. Alternatively, the computer system 10 may be interfaced with a conventional CRT monitor using RGB signals (and horizontal and vertical synchronization signals) and providing a non-interlaced image. The notebook computer 12 includes various input devices, such as a keyboard 18, a floppy disk drive 20, and a track ball 22. Those ordinarily skilled in the pertinent arts will recognize that the track ball is essentially a stationary mouse input device. The computer system 10 may include additional input devices, such as a hard disk drive, a CD-ROM, and a serial input-output (I/O) port. Several of these devices also function as output devices for the computer system 10 in addition to a liquid crystal display 24. As described hereinbelow, the display 24 is presented as being of dual panel type. As depicted, the notebook computer is being used to perform a multi-task operation. For example, the notebook computer 12 may be used to conduct a fmancial analysis, the data for which is displayed on LCD 24, and a graphical depiction of which is displayed on CRT 14.

Figure 4:
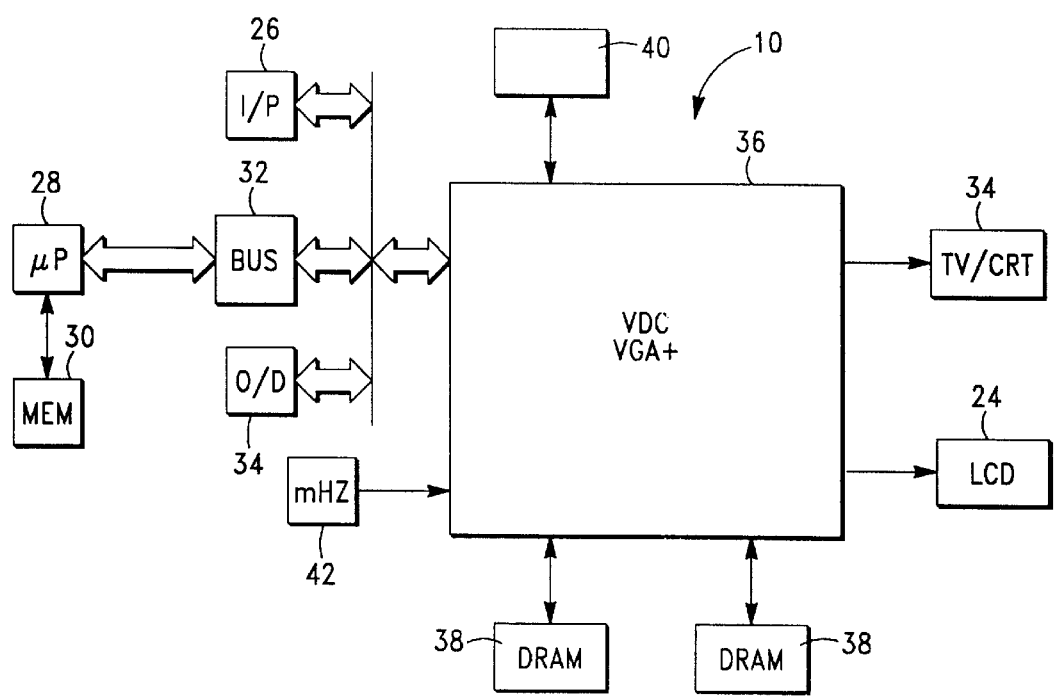
FIG. 4 is a schematic functional block diagram of the computer system seen in FIG. 1.

FIG. 4 provides a schematic block diagram of the computer system 10, with the input devices all subsumed within one representative block 26. The input devices are interfaced with a microprocessor 28, which also has an interface with a memory facility 30 that includes dynamic random access memory (DRAM). A data bus 32 interfaces with the microprocessor 28 and provides an interface with the output devices, including the LCD and CRT image display devices 14 and 24. The other output devices for the computer system 10 are subsumed in a representative block 14. In order to facilitate the interface with the image display devices 14 and 24, the computer system 10 includes a video display controller (VDC) 36 interfacing with the bus 32, and providing driving signals for the LCD 24 and CRT 14. The VDC 36 has an interface with DRAM, represented on FIG. 4 with the schematic blocks 38. Also, the VDC 36 has an interface with a power management facility 40 of the computer system 10. A dedicated clock 42 provides a reference clock rate to the VDC 36.

Figure 5:
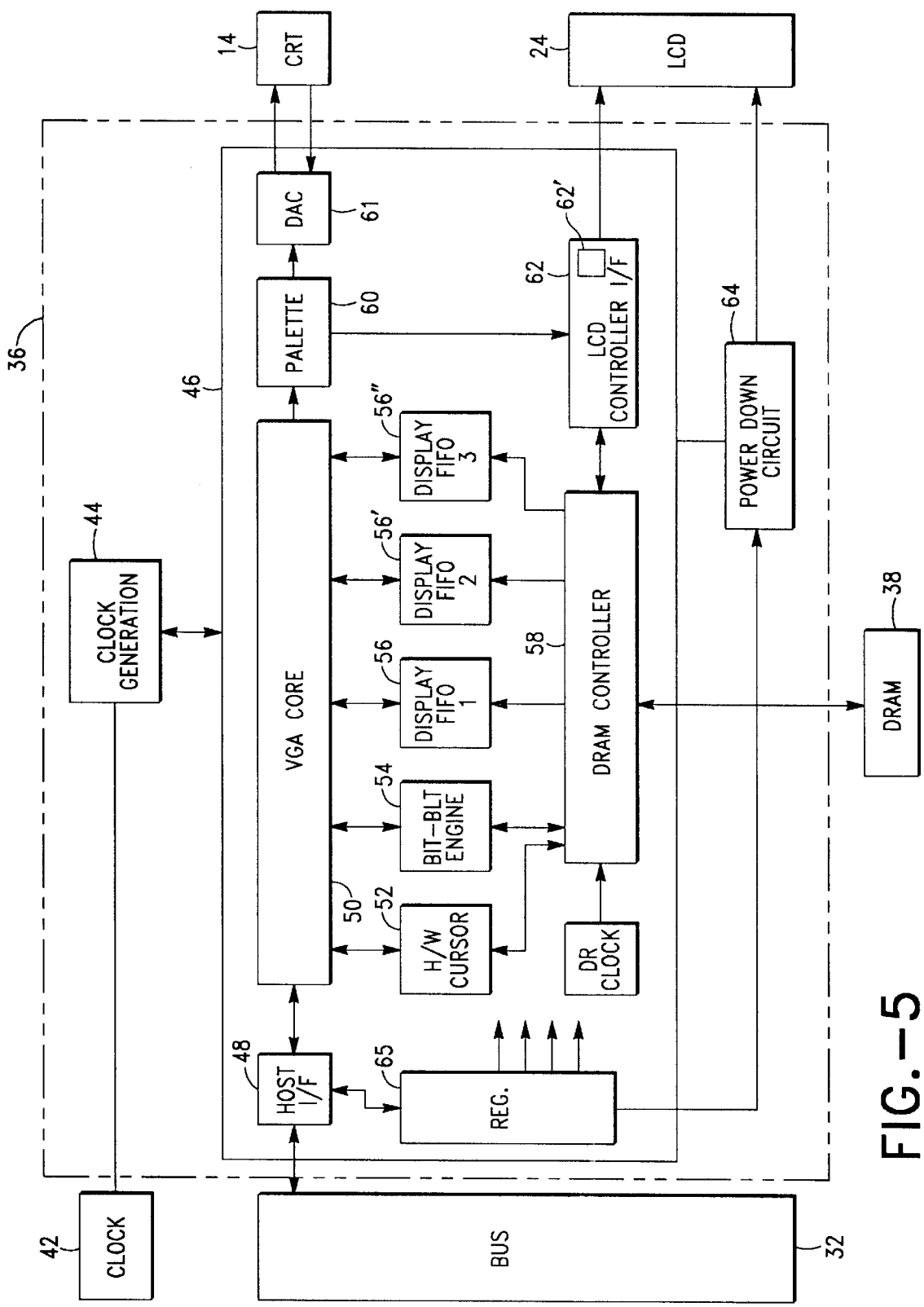
FIG. 5 provides a schematic functional block diagram of the video display controller (VDC) of the computer system seen in the preceding figures.

Turning now to FIG. 5, it is seen that the VDC 36 includes an internal clock 44 referenced to the clock signal from the dedicated clock 42, and providing clock signals to a video section 46 of the VDC. The clock signals provided by internal clock 44 may include a pixel clock (Pclk) and a memory clock (Mclk), the use of which will be further explained below. In order to interface the video section 46 with the bus 32, and hence with the microprocessor 28, the video section 46 includes a programmable host interface 48. The host interface 48 is programmable to configure the VDC 36 for interface with a number of conventional bus configurations. For example, host interface 48 may be configured for interface with a conventional Intel 486DX local bus, with a VL-Bus, and with a PCI interface bus. The host interface 48 interfaces the bus 32 with a VGA core portion 50 of the VDC 36. This VGA core portion 50 includes a sequencer, to be further described below, a cathode ray tube controller (CRTC), a graphics controller, an attribute controller, and conventional VGA circuitry.

In order to allow the VGA core 50 to generate and control the text, graphics and other visual characters to be displayed on the CRT and LCD (such as a cursor and icons, for example), the VGA core is interfaced with a hardware cursor generator 52, a bit-BLT engine 54, and a display FIFO 56. An additional two display FIFO's 56', and 56" are also interfaced with the VGA core 50. An alternative embodiment of the VDC 36 supporting only a single display device (either LCD or CRT) will include only a single display FIFO, and is further explained below. Another alternative embodiment supporting two display devices (one LCD and one CRT) will include two display FIFO's 56 and 56'. Of course, this embodiment will also support a single display device of LCD or CRT type. As will be explained, the embodiment including display FIFO 56 and the additional two display FIFO's 56' and 56", is employed to support the dual display operation of the computer system 10, as was explained with reference to FIG. 3, using a standard television as the second display device.

When a display device providing an interlaced image is used to display normally non-interlaced computer graphics imagery, the image ordinarily includes a lot of flicker. However, the computer system 10 (VDC 36) includes the two additional display FIFO's 56' and 56" which are employed to store alternate lines of the non-interlaced imagery, and to sequentially supply these alternate lines of imagery to the television 24 for display as an interlaced image with reduced flicker. Accordingly, hereinafter when the display FIFO 56 is referred to, this reference includes also display FIFO's 56' and 56". As will be ftuther explained below, the alternative embodiment of the invention having only a single display FIFO may implement a simplified decisional scheme when deciding on allowing access to the DRAM 38.

The hardware cursor generator 52 selectively provides a cursor of increased size (i.e., twice as large as normal, for example), which is easier to visually follow as it moves across a display screen, in response to detection of a certain preselected speed of movement of the cursor provided by a software program running on microprocessor 28. Thus, when a user of the computer system 10 uses the mouse or keyboard keys to move the cursor of a program, if the speed of movement reaches the preselected threshold, then the cursor becomes doubled or larger. The bit-BLT engine, as was explained earlier, provides for block transfers of bits generated to provide graphics and other such visual characters on the CRT and LCD screens 14 and 24.

More specifically, the bit-BLT engine performs read, write, and block transfers of bits representing these characters, solid fills, destination inversions, and pattern fills. The bit-BLT performs all data alignment and masking at the boundaries of block transferred characters, as well as text expansions to accelerate the writing of monochrome images. As was explained above, the display FIFO temporarily stores bits of information, in integer multiples of double-word size units or levels, awaiting the writing of these bits to pixels of the displays 14 and 24. Preferably, the display FIFO 56 is an eight-stage FIFO, storing eight 32-bit double-words of display information for sending to the CRT and LCD 14 and 24.

Each of the hardware cursor generator 52, bit-BLT 54, and display FIFO 56 are also interfaced with a DRAM controller 58. This DRAM controller 58, as will be further explained, implements the functions of the DRAM controller/sequencer described in general terms above to arbitrate and implement requests for access to the DRAM by various functional units of the computer system 10, including other portions of the VDC 36. As is seen in FIG. 5, the DRAM controller 50 has an interface with the DRAM 38. For purposes of simplicity of illustration, the DRAM 38 is shown in FIG. 5 as a single functional block. However, those ordinarily skilled in the pertinent arts will recognize that this DRAM may comprise one or several DRAM chips. The display FIFO 56 has an interface (via the VGA controller 50 and DRAM controller 58) with both a palette controller 60, and with a liquid crystal display (LCD) interface controller 62. The palette controller 60 interfaces with a digital-to-analog converter (DAC) 61. The palette controller implements the standard 256-by-18 VGA palette, while the LCD interface controller performs frame modulation and dithering for 64 shades of grey in monochrome mode operation; and 64k shades of red, green and blue for a full 256k colors in color mode operation.

In order to complete this explanation of the structure represented in FIG. 4, it will be noted that the VDC 36 includes a power down controller 64. This power down controller has an interconnection with a power down register 65, which itself has a generalized interconnection within the VDC 36. This generalized interconnection of the power down register 65 is indicated on FIG. 5 with the plurality of arrows leaving the register 65. These interconnections of the power down register 65 permeate the VDC 36 and allow it to be configured for various modes of operation and for various corresponding power down modes. Also, the power down controller 64 has an interface with the LCD 24 in order to facilitate such power saving functions as LCD back light "off", and LCD display "off", under control of parameters set by the user of the computer system 10.

Turning now to FIG. 6, a simplified graphical presentation of the display FIFO 56 is presented. Preferably, this display FIFO 56 has a capacity of 8, 32-bit double-words, or levels. These levels are indicated by the numerals 1–8 along the left side of FIG. 6. Other memory capacities may be employed for a display FIFO without departing form the spirit and scope of the present invention. From the bottom of this display FIFO, while the display 14 or 24 is active, data is continuously drained to the display units at a rate which is mode dependent, as was explained above.

At the top, the display FIFO is intermittently refilled at a rate dependent upon the speed of the DRAM 38 and of the memory clock of the VDC (as well as other parameters of the computer system 10). This refilling of the display FIFO is discontinuous, and occurs according to availability of the DRAM 38, as is further explained below. Along the right side of the graphical representation of FIG. 6, are placed two movable pointers. One of these pointers (pointer 66) indicates that when the data level in the FIFO falls below this pointer, then a FIFOLO request is issued for additional data from the DRAM. This pointer 66 has a permissible position from 4 to 7. The other pointer 68 indicates the issuance of a FIFOHI request for additional data from the DRAM 38. Pointer 68 has a permissible position from 0 to 7. In each case the issuance of a FIFOLO or FIFOHI request indicates that the FIFO 56 can accept at least one additional double-word level of data.

The position of the pointer 68 along the FIFO 56 is dependent upon the mode of operation of the displays 14 and 24 (indicative of the rate of drainage of the FIFO 56), and the rate of possible filling of this FIFO (determined by the interval of the pixel and memory clocks of the VDC, the speed of the DRAM 38, and other interconnect intervals and data transfer intervals of the VDC) such that a FIFOHI request can be issued at a time as early as level 7 or as late as zero level of data in the FIFO 56 in order to insure that the FIFO does not run out of data. As pointed out above, when FIFOHI is issued, other accesses to the DRAM 38 are interrupted. Accordingly, if the display FIFO is draining slowly and the computer system can refill the FIFO quickly, the pointer 68 can be set at zero and the display will still not run out of data.

The pointer 66 is dependent for its position on the mode of display operation and on similar parameters of the computer system 10. This pointer will be set in the range from 4 to 7 in order both to facilitate early filling of the FIFO 56 with a minimal number of FIFOHI requests being issued, and to allow other devices of the computer system with best access to the DRAM 38. Understandably, the set point for the FIFOLO request (pointer 68) is not as critical as that for the FIFOHI request, and as will be seen, the level for this FIFOLO request pointer fits into a lower-tier prioritization scheme implemented by the DRAM controller 58. However, the FIFOLO request is issued at a level of the FIFO attempting to obtain sufficient access to the DRAM that a FIFOHI request will not be issued, or that the intervals between FIFOHI requests will be maximized.

As will be seen, an address state machine continuously counts new levels (double-words) of data which have entered the FIFO 56, and on the filling into the FIFO of every selected number of levels of data, a decision is made whether to remove the FIFOLO or FIFOHI requests. At no other time is a request for data from the FIFO 56 cleared. The display FIFO need not be filled completely in order to clear a FIFOLO or FIFOHI request.

Turning now to FIG. 7, a functional block diagram of the interconnections of the DRAM controller 58 and DRAM with the various devices of the computer system 10 is depicted. The numeral 70 within a block indicates a possible request for a DRAM refresh cycle, which request is issued on a regular repeating time interval by a clock in the VDC 38 (indicated on FIG. 5 as "DR CLOCK"). Thus, the receipt of this request is a certainty. The time-sequencing of this request with the other requests is uncertain. Similarly, the numeral 72 within a block indicates a possible request for access to the DRAM by a half-frame buffer of the LCD controller 62 (indicated on FIG. 5 with the numeral 62'). This half-frame buffer receives and temporarily stores in the DRAM 38 pixel values which are written to the panels of the LCD 24. When the pixel values need to be refreshed, one of the panels receives fresh information from its associated display FIFO via the LCD controller 62. The other panel receives a repeat of previous pixel values which had been previously stored temporarily in the DRAM by the half-frame buffer 62'. The panels of the LCD 24 alternate in receiving fresh image data from the display FIFO and from the half-frame buffer 62', with the half-frame buffer temporarily storing the fresh pixel values in the DRAM 38 for use in refreshing the particular panel of the display 24 while the other of the two panels is receiving fresh image data. This half-frame buffer has a limited amount of internal memory. Accordingly, during a memory access to the DRAM 38, the half-frame buffer 62' will receive enough pixel values to provide refreshing of several pixels on the display 24. The half-frame buffer issues requests for access to the DRAM on a FRAMELO (low priority), or FRAMEHI (high priority) basis dependent upon the amount of data remaining in the limited memory capacity of the half-frame buffer for use in refreshing pixels of the LCD 24.

The numeral 74 within block 28 indicates a possible request made by the CPU 28 for access to the DRAM 38. The numeral 76 within block 54 indicates a possible request for access to the DRAM 38 issued by the bit-BLT engine 54, while the numeral 78 within block 56 indicates possible requests (FIFOLO or FIFOHI) issued by the display FIFO 56 seeking fresh data to be temporarily held for sending the display devices 14 or 24. As will be further explained, the FIFO requests may include a FIFOLO or FIFOHI request from and identified with each of the FIFO's 56, 56', and 56". Requests once made are continued (remain as pending) until satisfied, or until otherwise cleared in the case of the FIFOLO and FIFOHI requests.

Still viewing FIG. 7, the numeral 80 within a block indicates a possible request received from the mouse image generator circuits (i.e., introduced and explained above) for access to the DRAM 38 to draw a mouse image. The numeral 82 within a block represents an address generator servicing the display FIFO 56 (or FIFO's 56, 56', and 56") by generating addresses for use in reading data from the DRAM 38 to the display FIFO in response to a request for such data. Those ordinarily skilled in the pertinent arts will recognize that the embodiment having multiple display FIFO's 56, 56', etc., will also have a separate address generator 82 for each of these display FIFO's. A DRAM address multiplexer 84 provides the generated addresses to the DRAM 38. This address multiplexer also includes a facility for recognizing when generated addresses require a page break in the DRAM 38, and provides a page break signal (indicated with numbered arrow 88) to the SEQC 86 which is used in initiating the pre-charge sequence necessary in the DRAM 38 in order to allow a different page of this memory to be accessed. This page break signal is indicated when new data has a different row address from the last previous data input into the DRAM 38. In the event that the new data has the same row address, a page break signal is not issued, and page mode operation of the DRAM is maintained with no lost time for a pre-charge sequence even when the last previous data and the new data are from different devices of the computer 10. That is, a change of device accessing the DRAM 38 does not necessarily cause a page break in the DRAM 38.

Within SEQC 86 is a priority logic unit 90 implementing a logical selection process among the pending requests for access to the DRAM 38, as is illustrated in FIGS. 8 and 10. FIG. 8 represents the simpler alternative of a DRAM controller having only a single display FIFO 56, and will be considered first. Viewing FIG. 8, it is seen that the pending requests for access to the DRAM 38 are first of all assigned to one of two tiers (an upper tier and a lower tier), as will be further explained. Within the upper tier, pending requests are ranked in order of priority (numbered 1U through 5U). Similarly, within the lower tier, pending requests are ranked in order of priority (indicated as 1L through 3L). Within this logical structure of ranked pending requests for access to the DRAM 38, each upper-tier request may interrupt any existing access to the DRAM 38 granted in response to another upper-tier request with a lower rank, and may also interrupt an access granted in response to all lower-tier requests. Thus, if an access to the DRAM for the display FIFO is underway in response to a FIFOLO request (ranked 1L), and a request to refresh the DRAM is received by the SEQC (ranked 4U), then the display FIFO access is interrupted. The DRAM is then refreshed.

However, if during this refreshing of the DRAM, a CPU request for access to the DRAM is received (ranked 5U), the CPU will have to wait for access to the DRAM because the SEQC will not allow an interrupt for a lower ranked request even in the upper tier. On the other hand, if a FIFOHI request (ranked 2U) is received during a refresh of the DRAM 38, then this request will be honored by an interruption of the DRAM refresh and granting of access to the DRAM by the display FIFO for receiving new data for display. Within the lower tier of requests, no interrupts of existing accesses to the DRAM 38 are allowed. These lower-tier requests are simply allowed access to the DRAM in order of priority and may be interrupted by any upper-tier request. That is, an access to the DRAM 38 granted in response to a bit-BLT request (ranked 3L) will not be interrupted by any other lower-tier request, but may be interrupted by any upper-tier request.

Further to the above, FIG. 9 graphically depicts an additional function performed by the DRAM controller 58 by use of a level counter 92 (seen in FIG. 7), recalling that display FIFO 56 and DRAM controller 58 are both within the VDC 36 and are interfaced with one another. The level counter 92 continuously monitors addresses generated for accessing data within DRAM 38, and which are used in writing this data to the display FIFO 56. Every Nth level of data ("N" representing a selected integer multiple of levels of data provided to the display FIFO 56), the level counter 92 resets a flag or register in the SEQC 86. As FIG. 9 illustrates, the DRAM controller 58 simultaneously and independently tests the result of two separate questions. One question is whether the level of data in display FIFO 56 is below the FIFOLO pointer. IF the answer is "no", the question is continued. If the answer is "yes", then the FIFOLO request is issued. Every Nth level of data written to the display FIFO 56 (as indicated by the reset flag or register explained above), the question is asked again, and if the answer is "no", the FIFOLO request is cleared. Thus, FIFOLO may be cleared without the display FIFO being completely filled with data.

Similarly the other question is whether the level of data in display FIFO 56 is below the FIFOHI pointer. IF the answer is "no", the question is continued. If the answer to this question is "yes", then the FIFOHI request is issued. As pointed out above, FIFOHI (ranked 2U, recalling FIG. 8) will effect an interrupt of all other requests for access to the DRAM 38, except for the mouse request (ranked 1U). Thus, the issuance of FIFOHI will in a very short time result in data being accessed in DRAM 38 and written into the display FIFO 56. Every Nth level of data written to the display FIFO 56 (as indicated by the reset flag or register explained above), the question is asked again, and if the answer is "no", the FIFOHI request is cleared. Thus, FIFOHI may also be cleared without the display FIFO being completely filled or even filled to the level of the FIFOLO pointer. The display FIFO 56 need only be filled to a level above the FIFOHI pointer at the completion of writing N levels of data into the display FIFO.

Preferably, the value of "N" is selected to be four (4). This value for N is convenient with a display FIFO having eight levels as described, and with these levels each being 32 bits. In some VGA modes of operation, each pixel takes 4 bits, and the frame buffer refreshes the LCD display every 32 pixels, so there is a beneficial correlation in these modes of operation between the sequencing of frame refreshes, and the writing of N levels of data to the display FIFO. Of course, the display FIFO need not be eight levels deep, and N need not be selected to be four. N will be selected in view of the interplay between the size of the display FIFO and the speed at which data can be accessed (DRAM speed) and written to this display FIFO, as well as the rate at which the display FIFO is depleted of data, and the requirements for other devices of a particular system to access the DRAM.

Considering now FIG. 10, the priority logic scheme implemented by the priority logic unit 90 in the more complex alternative of a DRAM controller having two or more display FIFO's 56, 56', 56", etc., is presented graphically. Viewing FIG. 10, it is seen that the pending requests for access to the DRAM 38 are first of all assigned to one of three tiers (an upper tier, a middle tier, and a lower tier), as will be further explained. Within the upper tier, pending requests are ranked in order of priority (numbered 1U through 3U). It will be noted that this tier has several co-equal requests at one ranking level, as will be explained further. Within the middle tier, requests are ranked from 1M to 2M. Similarly, within the lower tier, pending requests are ranked in order of priority from 1L through 3L. Within this logical structure of ranked pending requests for access to the DRAM 38, each upper-tier request is placed in a queue of requests in that tier.

These requests for access to the DRAM 38 are honored in order of their position in the queue. The upper tier requests may not interrupt any existing access to the DRAM 38 granted in response to another upper-tier request. It will be noted that these upper-tier requests 1U–3U include a rank (2U) containing several co-equal requests. That is, the upper-tier rank 2U includes plural FIFOHI$_N$ requests, in which the subscript "n" indicates the one of several FIFO's 56$_{1-n}$ making the request. Viewing FIG. 5, it will be seen that the FIFO's 56, 56', and 56" each carry a numerical identifier 1–3, with this identifier being used to indicate the source of a FIFO access request in FIG. 10. On the other hand, an upper tier request may interrupt any existing access to the DRAM granted in response to any middle-tier or lower-tier request. A middle-tier request may not interrupt any upper-tier access, and may only interrupt any DRAM access granted in response to a middle-tier request with a lower rank, or any access granted in response to a lower-tier request. The lower-tier requests are not able to interrupt any other access to the DRAM, and are placed in a respective queue for service. It will be noted that these lowertier requests also include a rank (1L) containing several co-equal requests. That is, the lower-tier rank 1L includes plural FIFOLO$_n$ requests, in which the subscript "n" similarly indicates the one of several FIFO's 56$_{1-n}$ making the request.

Figure 11:
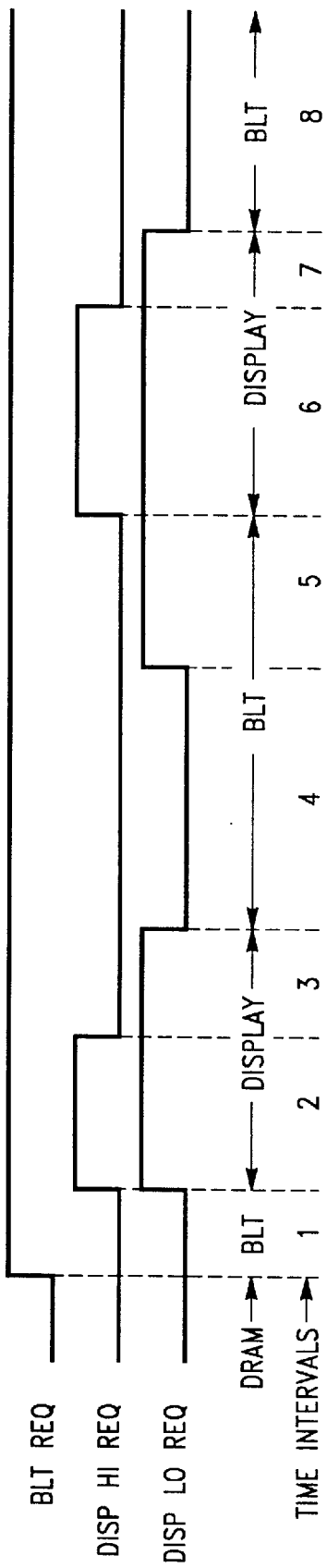
FIGS. 11 and 12 provide timing diagrams illustrating the result of the arbitration for access to the DRAM performed by the SEQC of the present computer system.
Figure 12:
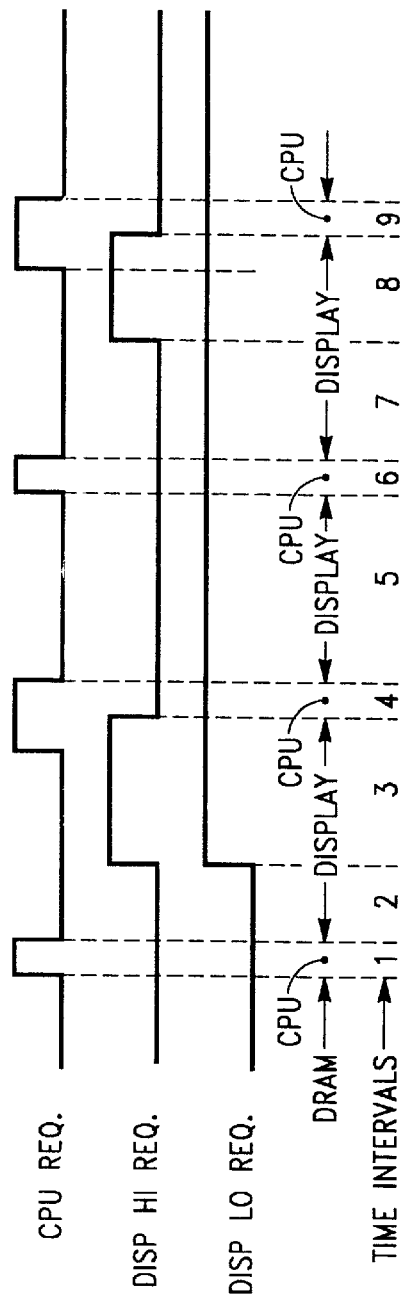

FIGS. 11 and 12 present timing diagrams illustrating (by way of example only) a result of the two-tiered arbitration for access to the DRAM performed by the SEQC of the present computer system. A similar result can be expected with a three-tiered arbitration scheme as presented in FIG. 10. Viewing first FIG. 11, it is seen that in interval #1, the bit-BLT has made a request for access to the DRAM, and that this request is granted. At the beginning of interval #2, the display FIFO has made a request for access to the DRAM. The fact that both FIFOLO and FIFOHI are issued simultaneously indicates that the display FIFO is empty of display data. In interval #2, the display FIFO supersedes the bit-BLT request (recalling the priority scheme of FIG. 8), and receives sufficient display data to result in the FIFOHI request being canceled (recalling the test conducted by the flow chart of FIG. 9). In interval #3, the display FIFO is still serviced by the DRAM because a FIFOLO request (still pending) has a higher priority than the pending bit-BLT request.

In interval #4, the FIFOLO request is canceled (not an indication of a full FIFO, but of a FIFO level above the FIFOLO pointer), and the bit-BLT request is honored. At the beginning of interval #5, the FIFOLO request is issued, but the bit-BLT engine retains access to the DRAM because lower-tier requests cannot interrupt one another (recalling FIG. 8). At interval #6, FIFOHI is issued, and interrupts the access of the bit-BLT. Interval #7 indicates that FIFOHI has been canceled, but that the display FIFO retains access to the DRAM, again because the pending bit-BLT request is also a lower-tier request and cannot interrupt the still-pending FIFOLO request. Interval #8 indicates that when FIFOLO is canceled, then the pending bit-BLT request is honored.

FIG. 12 presents a similar arbitration episode, this time with the SEQC arbitrating between the CPU and the display FIFO. Viewing FIG. 12, interval #1 indicates a CPU request for access to the DRAM. This request is granted and the CPU signs off. In interval #2, the DRAM is idle, but interval #3 indicates that the display FIFO has made a request for access to the DRAM. Again, the fact that both FIFOLO and FIFOHI are issued simultaneously indicates that the display FIFO is empty of display data. In interval #3, the display FIFO supersedes the CPU request (recalling the priority scheme of FIG. 8), and receives sufficient display data to result in the FIFOHI request being canceled (again recalling the test conducted by the flow chart of FIG. 9).

In interval #4, the CPU is allowed access to the DRAM because an upper-tier request can interrupt an access granted for any lower-tier request (FIFOLO being a lower-tier request). In interval #5, the CPU has signed off the DRAM, and the FIFOLO request is honored. Interval #6 indicates that the CPU has made a request for access to the DRAM, which interrupts the display FIFO access because only FIFOLO is pending. When the CPU signs off the DRAM (interval #7) the DRAM access is returned to the display FIFO. At the beginning of interval #8, the FIFOHI request is issued and is honored, however this interval #8 includes the issuance of a CPU request for access to the DRAM which is not honored because the CPU cannot interrupt a higher-ranked upper-tier request. Interval #9 indicates the clearing of FIFOHI, and the granting of access to the CPU, because the CPU can interrupt the display FIFO request based on the pending FIFOLO request.

Having considered the SEQC 86 and operation of the display FIFO 56, attention may now be directed to the architecture of the VDC 36 which allows it to provide driving signals to a double display devices. As was explained above, the double display devices may include one or two CRT's, one or two LCD's, or a mixture of a CRT and an LCD, each of which will show differing display imagery. Alternatively, a conventional television may be substituted for the CRT, as was explained above with respect to display FIFO's 56' and 56", which will handle the interlacing chore for providing an NTSC format signal to the television. Considering now FIG. 13, a conventional architecture for a computer system 94 is shown. This conventional architecture includes a DRAM 96 within which a virtual memory desk top space 98 is defined. Within the desk top space 98 are defined two display memory spaces 100 and 102, one marked with the #1, and other marked with the #2, to indicate to which one of the two displays the respective memory space is allocated. Within the desk top memory space 98 the two memory spaces 100 and 102 may be moved around and selectively positioned by a user of the computer system 94. The memory spaces 100 and 102 are selectively positioned on the desk top 98 by the user specifing the location of a reference corner 104, and 106, respectively, of each memory space. The user also needs to specify the size of each display—with the memory space having the same virtual size as the associated display.

The virtual desk top is large enough that the user can relatively position the memory spaces 100 and 102 one above the other, or side-by-side, for example. As so positioned, if the user places the near edges of the memory spaces 100 and 102 next to one another, then imagery may extend from one display screen to the other without a break, and a cursor may be moved across the memory space 98, leaving one display to appear immediately in the other display, for example. However, if one considers how the conventional architecture achieves this double display function, it is seen that the computer system includes a sequencer 108 allowing accesses to the DRAM 96, and feeding display data to a pair of dedicated display processing channels, or pipelines, generally referenced with the numerals 110 and 112. Conventionally, each of these display pipelines would include a respective display FIFO 114, and a respective display processor 116, each feeding display driving signals to the respective one of the two displays, each referenced with the numeral 118.

As can be readily seen, this conventional architecture for a computer system requires the duplication of a considerable number of circuits and components of the computer system. For example, in the past it has been conventional to operate a computer system with double displays and having a separate video controller card (monochrome or color) dedicated to the particular display device driven by the particular card. Thus, it is seen that changing the configuration of the computer system is not easily accomplished. Further, were the computer system to be of the notebook or portable configuration having a single display (usually of the LCD flat-panel type), it is not easily accomplished to interface the computer system with what ever type of CRT, monitor, or television set which happens to be available at a particular location in order to use the double display capability of the computer system.

Turning now to FIG. 14, another portion of the internal architecture of the VDC is depicted along with its interconnection to related devices of the computer system 10. In order to obtain reference numerals for use in describing the structure seen in FIGS. 14 through 18, structure which is the same as, or which is equivalent in structure or function to, structure described above is referenced with the same numeral used above, and having a prime (') added thereto if such is necessary to avoid confusion. In this instance, the two display devices are referenced with the numerals 14/24, and 14/24' to indicate that each of the display devices may be either a CRT or an LCD. The configuration of computer system seen in FIG. 14 is not intended to drive a conventional television as a substitute for one of the CRT's. However, as was explained above, the SEQC may include three (rather than only two) display FIFO's 56 (i.e., 56' and 56") so that an interlaced image signal can be provided to a conventional television. Further, duplicated components are referenced with the same numeral uses above, and having one or more primes added thereto. Accordingly, those ordinarily skilled in the pertinent arts will appreciate that the architecture described with reference to FIG. 14 may be expanded by another increment in order to drive a conventional television.

Considering FIG. 14, it is seen that the VDC 36 includes a pair of display FIFO's (referenced with numerals 56, and 56') each having an associated display FIFO counter 92, 92', and an associated address generator 82, 82'. For simplicity of illustration, the host interface 48 is depicted in FIG. 14 as merely a dotted line boundary. Within the DRAM 38 is created a virtual desk top, like that explained above with reference to FIG. 13. The virtual desk top includes separate memory spaces 100', and 102' each allocated to one of the two display devices 14/24. As was explained above with respect to the SEQC 86 of the DRAM controller 58, this SEQC arbitrates requests for access to the DRAM 38, including accesses to the virtual desk top, and memory spaces 100', 102'. Display FIFO 56 accesses display data from memory space 100' and delivers this data to a display data processing pipeline (hereinafter, "the pipeline", or just "pipeline"), generally indicated with the numeral 120, for sending to the associated display device 14/24. Those ordinarily skilled in the pertinent arts will recognize that the pipeline 120 is not a pipe, but is a complex display data processing circuit (DDPC), as is further explained below. Similarly, display FIFO 56' accesses display data from the memory space 102' for sending to associated display device 14/24' via the same processing pipeline 120.

The processing pipeline (DDPC) 120 accepts the display data provided from the particular one of the display FIFO's 56, and 56', and provides signals driving the associated display 14/24, and 14/24'. As mentioned above, because the VDC has more than one display FIFO, the SEQC 86 will employ the three-tiered priority scheme explained above to arbitrate accesses to the DRAM 38. However, the display FIFO's 56 and 56' will be allowed sufficient access to the DRAM 38 that the FIFO's do not run out of display data originating with the particular memory spaces 100' and 102'. Accordingly, although the accesses to the DRAM 38 are intermittent for each of the display FIFO's 56 and 56', the displays 14/24 and 14/24' will each be supplied simultaneously with different display data. That is, the user of the computer system 10 will see a different image presented on the displays 14 and 24 simultaneously. In order to control part of the variable configuring of display pipeline 120 to operate with various CRT's, the VDC 36 includes a cathode ray tube counter (CRTCNTR) 122. Dependent upon the capabilities of the particular CRT's interfaced with the computer system 10, the CRTCNTR 122 may be able to read the number of lines of resolution which the monitor can provide. In other cases in which monitors not having a communication bus over which this data can be read are interfaced with the computer 10, the user will have to enter this information.

Figure 15:
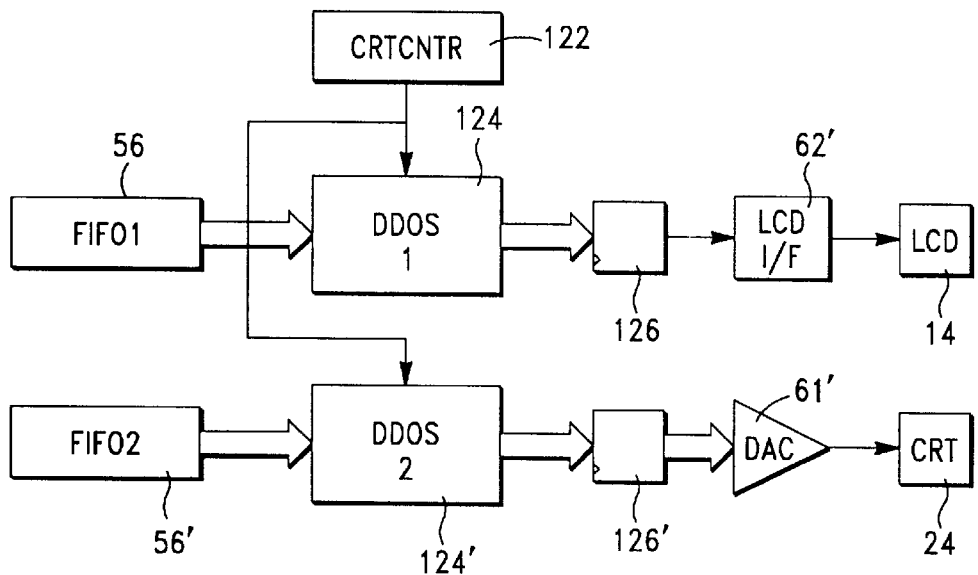
FIG. 15 is a functional block diagram of a portion of the VDC represented in FIG. 14.

FIG. 15 provides a high level functional block diagram of the display processing pipeline (DDPC) 120. Even though this display processing pipeline appears to present two separate processing channels, each serving one of the display FIFO's 56 or 56', the processing channels are defined in functionally cooperating elements of a complex and variably-configurable circuit. That is, the processing pipeline 120 is variably configurable to match the processing requirements of the mode of operation and type of display devices interfaced with it. In general terms, the display pipeline 120 provides at least a pair of dedicated and variably configurable data decode and over scan site (DDOS) 124 or 124' for each of the display FIFO's 56 and 56', respectively.

As was explained above with respect to the operation of the display FIFO's 56, the display data is provided in units of 32-bit double-words. Each DDOS 124 accepts 32-bit double-words of data and manipulates this data into a form recognizable and acceptable to the particular type of display device 14/24 which is displaying the image from each associated memory space 100' or 102', as will be further explained. For example, in the event that one of the display devices 14/24 is being operated in 16 color mode, then each pixel requires 4 bits of data from the display memory space 100' or 102' of DRAM 38. In this case, each 32-bit double-word of data will convey 8 pixel values, each having 4-bits. On the other hand, if the display is being operated in 256-color mode, then each pixel requires 8 bits of display data. In this case, each 32-bit double-word of data will convey 4 pixel values, each of 8 bits. For both of the 16 and 256 color modes, the pixel data values represent indexes into a color palette. Accordingly, the color values in the color palette are retrieved prior to sending the pixel data to the display.

Alternatively, in 64k color mode, each pixel requires 18 bits (16, plus 2), and the 32-bit double words can convey two pixel values, each having 16 bits. In 64k (or 32K) color mode, the pixel values represent the actual color values. Thus, no color palette look up is required. The addition of the extra two bits for each pixel will be described below.

Figure 16:
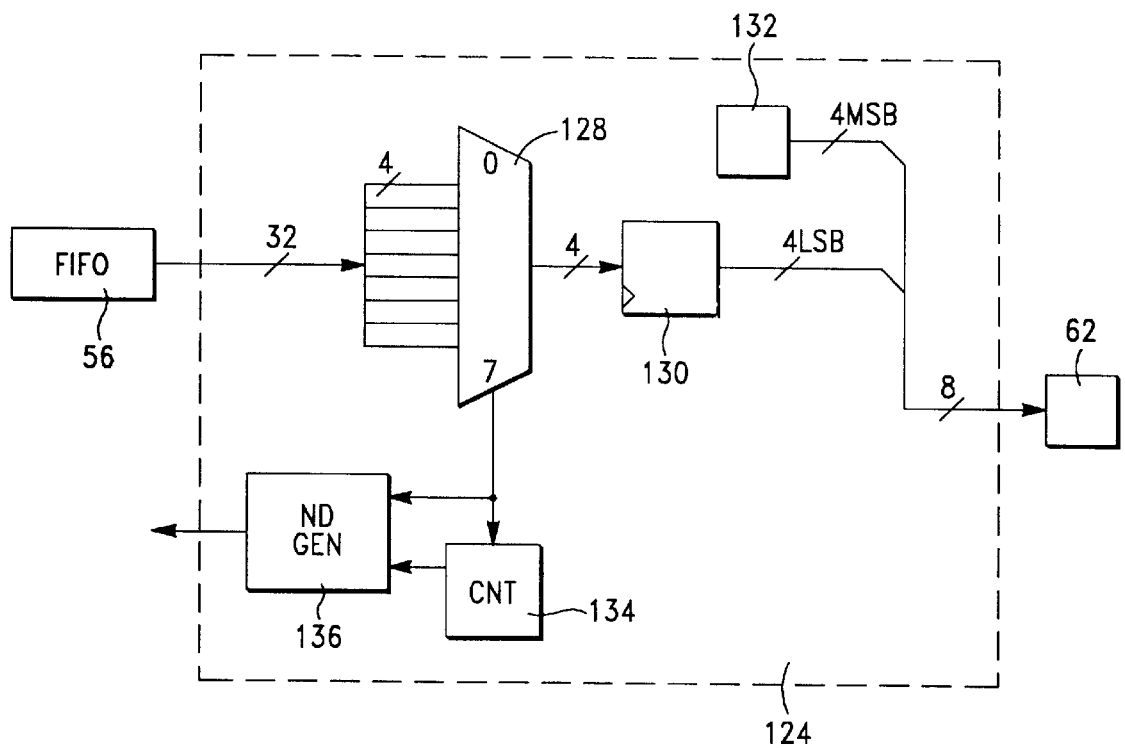
FIGS. 16, 17, and 18 are functional block diagrams of portions of the VDC seen in FIGS. 14 and 15.

Each DDOS 124, or 124' feeds pixel values to a respective flip flop 126, or 126', respectively feeding a LCD interface 62 if the display device is an LCD 14, or a DAC 61 if the display device is a CRT. FIG. 16 illustrates one of the possible alternative variable configurations for a DDOS 124 within the pipeline 120. In this configuration, the double-words of data are entered into respective locations (numbered 0–7 on FIG. 16) of a 8-channel de-multiplexer 128. From the demux 128, the bits are taken four at a time via a flip flop so that they appear as the four least-significant bits of an 8-bit word. The remaining four bits (i.e., the most significant bits) are added by a register 132, all as zero values. This is the required bit-word format for the 16-color mode of display operation. The display device is operated in 16-color mode. Accordingly, the DDOS provides 8-bit words of display data to a LCD interface 62', as explained above. A counter 134 tracks the input versus the output of the demux 128, and provides a signal to a request generator 136 when an additional 32-bit word of display data can be provide from the associated display FIFO 56 or 56'.

Figure 17:
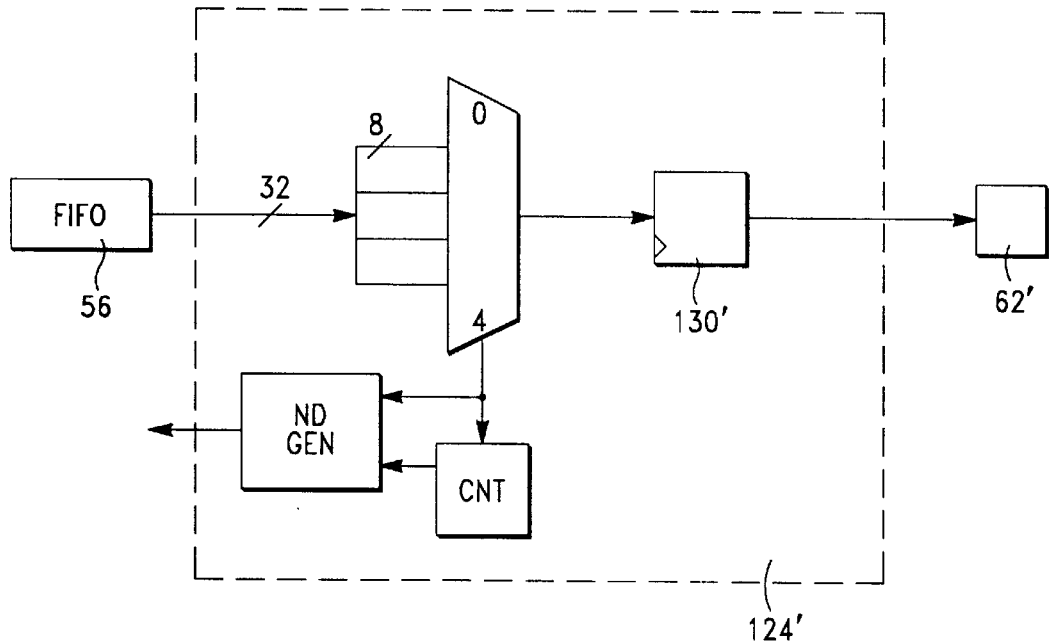

FIG. 17 provides an illustration of an alternative variable configuration for a DDOS 124' of the pipeline 120. In this case, a display device is operated in 256-color mode. The demux 128' is of 4-channel configuration. Consequently, the bit values are taken eight at a time via the flip flop 130' to a display device. Again, the LCD interface 62' accepts 8-bit words of display data, this time providing 256 color mode operation.

Figure 18:
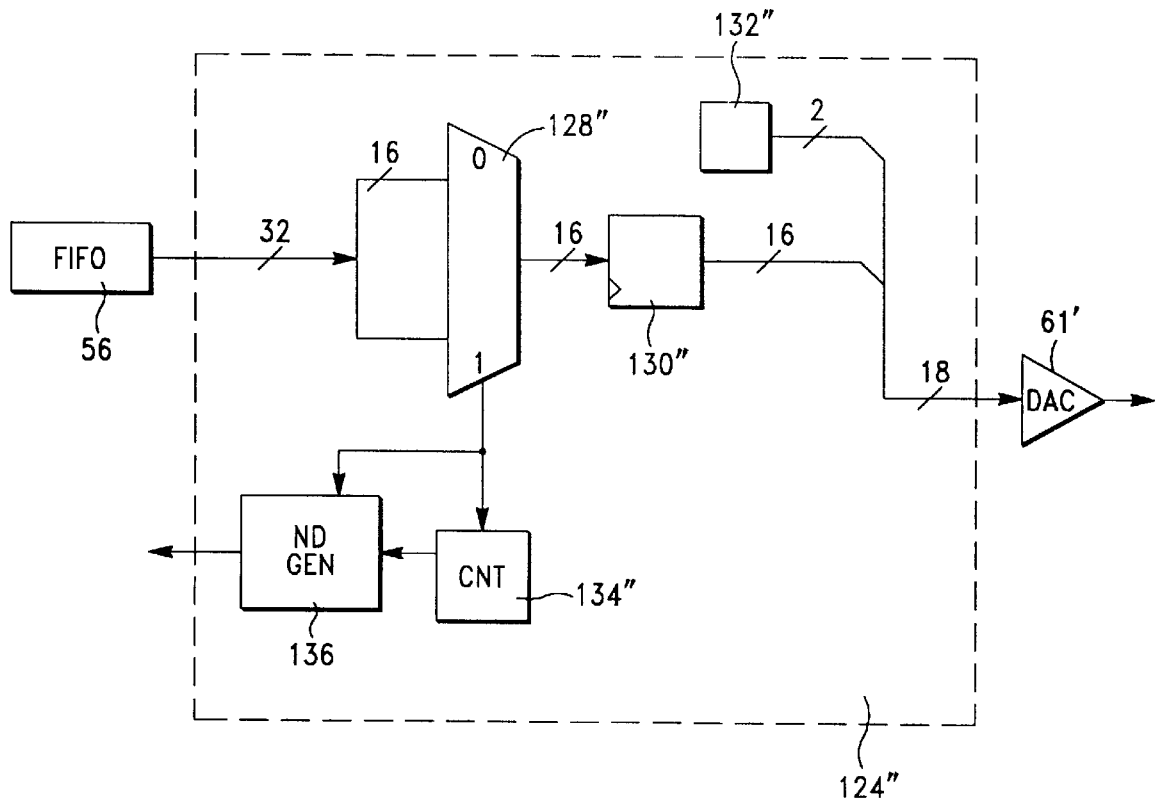

Finally, FIG. 18 provides a functional block diagram of yet another alternative variable configuration for a DDOS 124" within the pipeline 120. In this case, the display data from a display FIFO 56 or 56' is to be decoded into a 64k color mode image. Accordingly, eighteen bits are required for each pixel value. The sixteen least significant bits are obtained from corresponding locations of a two-channel demux 128'. A register 132" provides the needed additional most significant bits for each display data word. The 18-bit display data words are provided to a DAC 61', and hence to a CRT.

In view of the above, those ordinarily skilled in the pertinent arts will recognize that the DDOS 124, 124' and 124" share many similarities. The number of channels being employed in the demux 128, 128' and 128" being a most significant difference in these DDOS configurations. Corresponding count values are used in each counter 134, 134' and 134" according to the number of channels being used in the demux's 128. Accordingly, it is seen that the configuration of the internal DDOS's of the display pipeline 120 is responsive to the mode of operation of the particular display device, as well as the type of display device to vary in configuration particulars while keeping the same general configuration in general as is seen in FIGS. 16 through 18. In this way, a single variably-configurable display processing pipeline may be employed with far greater flexibility and lower cost than is necessitated by the dedicated display pipeline circuit configurations described above and illustrated in FIG. 13.

Having described VDC 36 that includes a pair of display FIFOs each having an associated display, an embodiment is now described that uses a pair of display FIFOs for the display of overlays in a single display device 14/24. Generally, overlays are windows on top of any existing graphics background that contain animation, video movies, or the like. Sources for overlay data include video cameras, CD-ROMs, hard disks, networks, modems, etc. This overlay data can be defined in a variety of formats including 16-bit RBG, 24-bit RGB, 422 YUV, MPEG, etc.

Figure 19:
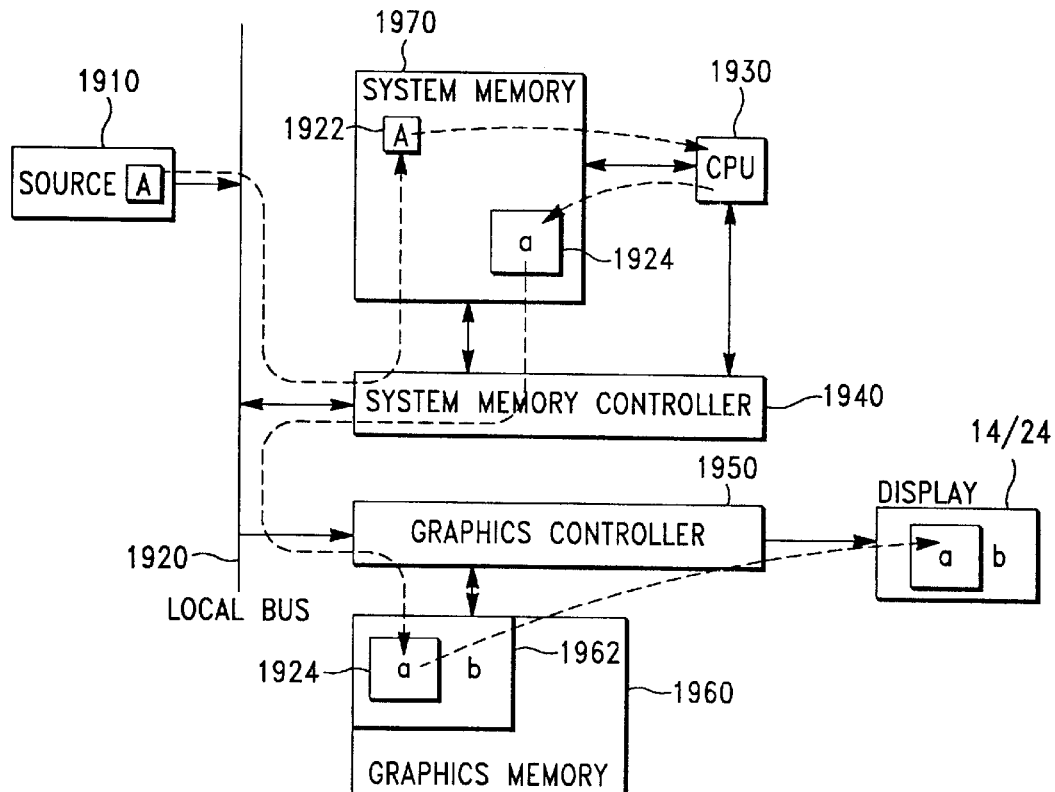
FIG. 19 illustrates a software solution to the processing of overlays.

Conventional multimedia systems that support single or multiple overlays have relied upon software solutions. An example of a conventional software solution is illustrated in FIG. 19. In this software solution, a video stream "A" is generated by source 1910 and initially stored in system memory 1970. In order to put image data "A" 1922 into the format of background display data "b" 1962, CPU 1930 converts image data "A" 1922 writes new image data "a" in system memory 1970. In this conversion process, CPU 1930 can also scale, interpolate, and border shape image data "A" 1922.

CPU 1930 subsequently retrieves image data "a" 1924 from system memory 1970 and writes it directly into graphics memory 1960. Image data "a" 1924 is then overlayed onto background display data 1962. Lastly, graphics controller 1950 rasterizes the combined image and background display data in graphics memory 1960 to display 14/24.

One of the drawbacks in this conventional software solution is performance. The scaling, interpolation, border shaping, and data format conversion functions that are performed by CPU 1930 are processor intensive. Thus, in processing a single overlay, system throughput can be diminished to the point where CPU 1930 cannot support the 30 frames/second required for motion video. As one can readily appreciate, system throughput is farther diminished by the existence of multiple overlays that are produced by one or more sources.

The present invention improves system performance by reducing the CPU processing demanded by software-based solutions. Specifically, the present invention is a hardware-based solution that dedicates a pathway (or pipeline) to the processing of display data for one or more overlays. This pathway is distinct from the pipeline that is dedicated to the processing of display data for background graphics.

Figure 20:
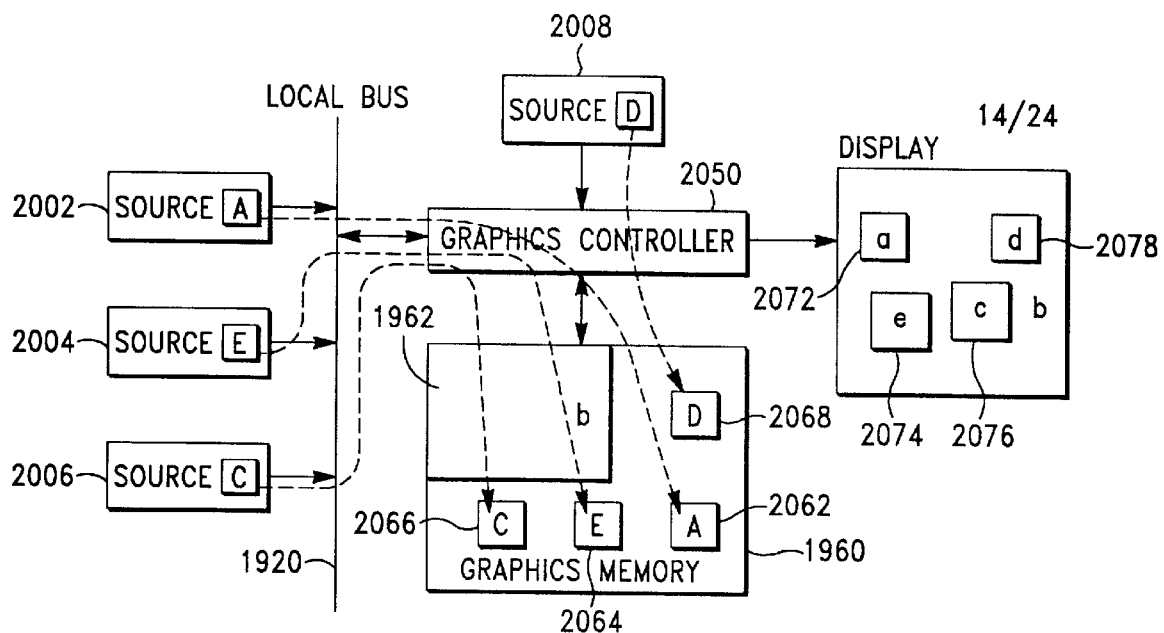
FIG. 20 illustrates a hardware solution to the processing of overlays.

A high-level overview of the system operation is provided with reference to FIG. 20. As shown, sources 2002, 2004, and 2006 send overlay display data to graphics controller 2050 via local bus 1920. Graphics controller 2050 then forwards the overlay display data to graphics memory 1960. Alternatively, overlay data can bypass local bus 1920 through a direct video port (not shown) integrated into graphics controller 2050.

As further shown in FIG. 20, the overlay display data 2062, 2064, 2066, and 2068 is stored in its native format in an off-screen part of graphics memory 2060. This process is distinct from conventional solutions which store converted overlay display data 1924 in an on-screen part of graphics memory 1960. As will be described in greater detail below, overlay display data 2062, 2064, 2066, and 2068 is retrieved and processed by an overlay pipeline within graphics controller 2050 and finally rasterized to display 14/24. The overlay pipeline, performs all scaling, interpolation, border shaping, and data format conversion functions for overlay data 2062, 2064, 2066, and 2068 to produce displayed images 2072, 2074, 2076, and 2078, respectively.

By incorporating these functions within graphics controller 2050, the CPU is relieved of all overlay operations. Moreover, traffic on local bus 1920 is reduced since the traffic between source 1910 and system memory 1970 is eliminated. This additional bandwidth accommodates the overlay data from a plurality of sources 2002, 2004, and 2006.

An additional benefit of the architecture of the present invention is the support for hardware-assisted double buffering for overlays. Double buffering is described in greater detail in J. D. Foley et al., "Computer Graphics: Principles and Practice," 2nd ed., Addison-Wesley Publishing, 1990, which is incorporated by reference in its entirety. Generally, double buffering is used extensively where smooth animation is critical. In this process, an application draws in a first area of memory while a second area of identical dimension acts as a source of the display. When the application completes the drawing process in the first area of memory, the graphics controller and the application swap memory locations. The application now draws in the second area of memory while the first are of memory acts as the new source of the display. The implementation of this double buffering feature is described in greater detail below.

Figure 21:
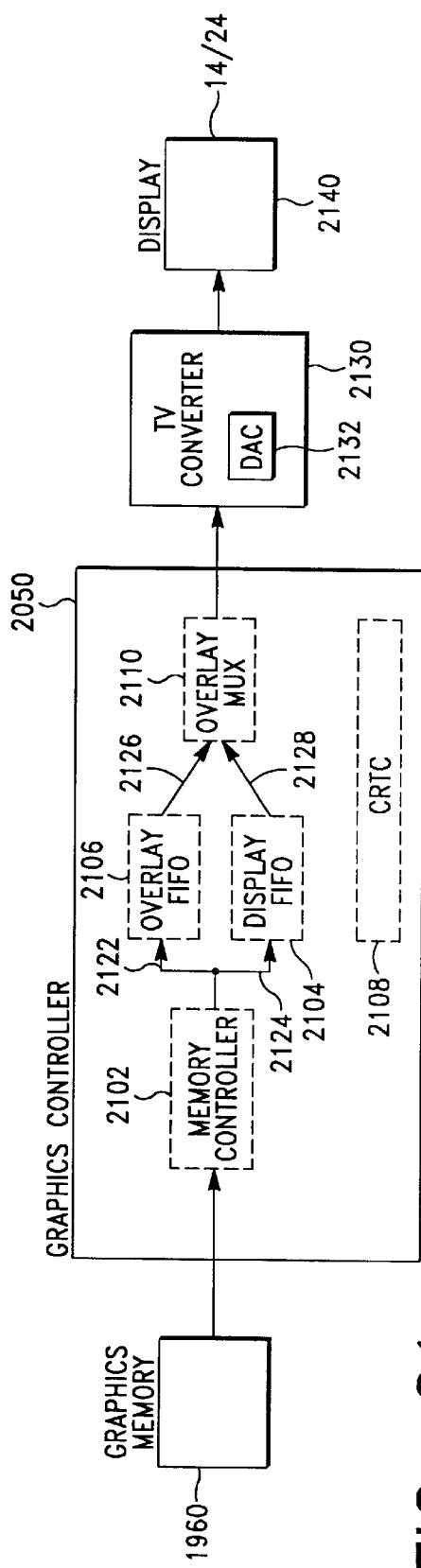
FIG. 21 illustrates a preferred embodiment of a graphic controller for processing overlays.

Having described the general functionality, a more detailed view of graphics controller 2050 is provided in FIG. 21. As noted above, graphics controller 2050 transfers both overlay data and background data from graphics memory 1960 to display 14/24 using separate pipelines. Graphics controller 2050 comprises memory controller 2102, display FIFO pipeline 2104, overlay FIFO pipeline 2106, CRTC 2108, and overlay mux 2110. Memory controller 2102 is the interface to graphics memory 1960. Memory controller 2102 receives memory access requests including those requests described in FIG. 7. In a preferred embodiment, the priority scheme identified in FIG. 10 is used to arbitrate requests that can be received from multiple FIFOs (i.e., display FIFO pipeline 2104 and overlay FIFO pipeline 2106).

As described above, display FIFO pipeline 2104 is the conventional pipeline that reads in graphics background data from the background portion (not shown) of graphics memory 1960 and outputs the background display data in the format of TV display 2140 (e.g., 24-bit RGB). As shown in FIG. 21, display FIFO pipeline 2104 retrieves the background display data from graphics memory 1960 via memory controller 2102 and path 2124. The background display data is output from display FIFO pipeline 2104 to overlay mux 2110 via path 2128.

Overlay FIFO pipeline 2106, on the other hand, is the pipeline dedicated to the overlay data. Overlay FIFO pipeline 2106 retrieves the overlay display data from graphics memory 1960 via memory controller 2102 and path 2122. The overlay display data is output from overlay FIFO pipeline 2106 to overlay mux 2110 via path 2126.

Figure 28:
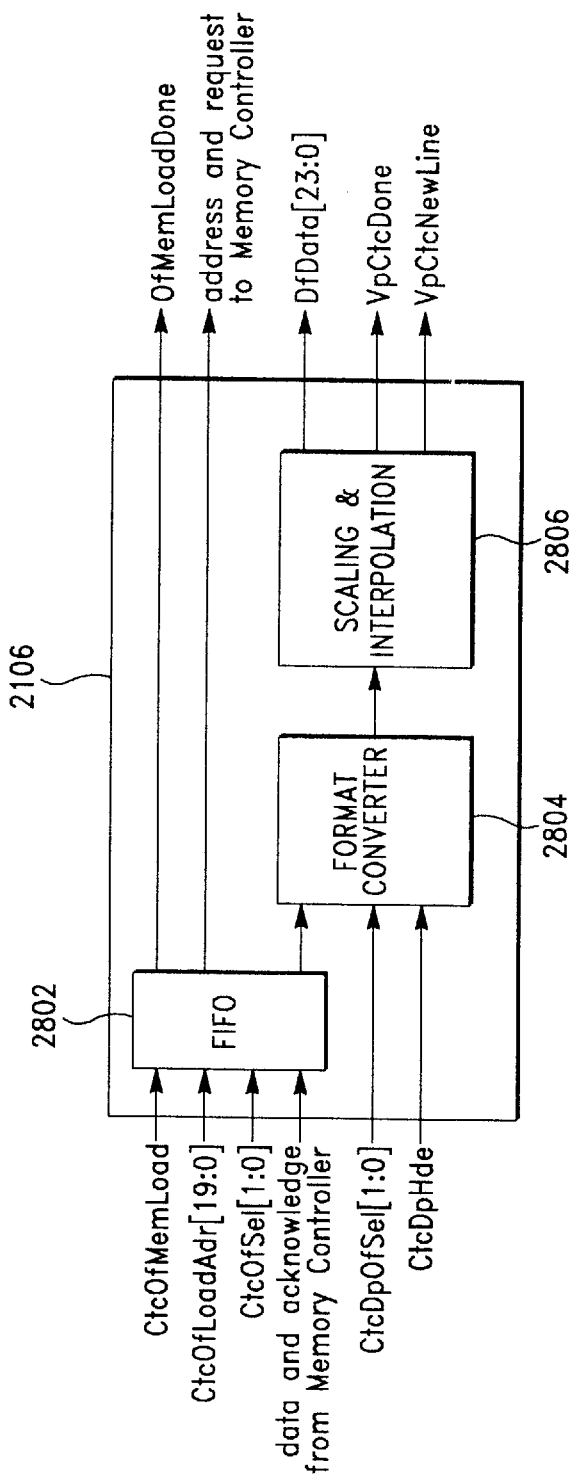
FIG. 28 illustrates an embodiment of the overlay FIFO pipeline.

An embodiment of overlay FIFO pipeline 2106 is illustrated in FIG. 28. Overlay FIFO 2802 reads in overlay data (not shown) from off-screen graphics memory and outputs the overlay data in the format of the display. Since the overlay data is stored in its native format, format converter 2804 is responsible for performing any format conversion required. As noted above, overlay FIFO pipeline 2106 is also responsible for performing any required scaling and interpolation. These functions are performed by scaling and interpolation unit 2806. The function and definition of the input/output signals of overlay FIFO pipeline 2106 are described below with reference to CRTC 2108.

Overlay mux 2110 receives the data streams from display FIFO pipeline 2104 and overlay FIFO pipeline 2106 via paths 2128 and 2126, respectively, and selects the data stream to be output to the display. The selection of the proper data stream is based upon control signals (not shown) from CRTC 2108. CRTC 2108 also controls the progression of data within display FIFO 2104 and overlay FIFO pipeline 2106.

In the embodiment shown in FIG. 21, overlay mux 2110 outputs noninterlaced display data to TV converter 2130. The functions of TV converter 2130 include (1) the conversion of noninterlaced display data to interlaced display data, and (2) the color conversion of RGB data to YIQ (NTSC standard) or YUV (PAL standard) data. The converted data is then output to TV display 2410. In other embodiments, overlay mux 2110 could send display data to a CRT 14 or a LCD 24 via DAC 61' and LCD I/F 62', respectively.

Figure 22:
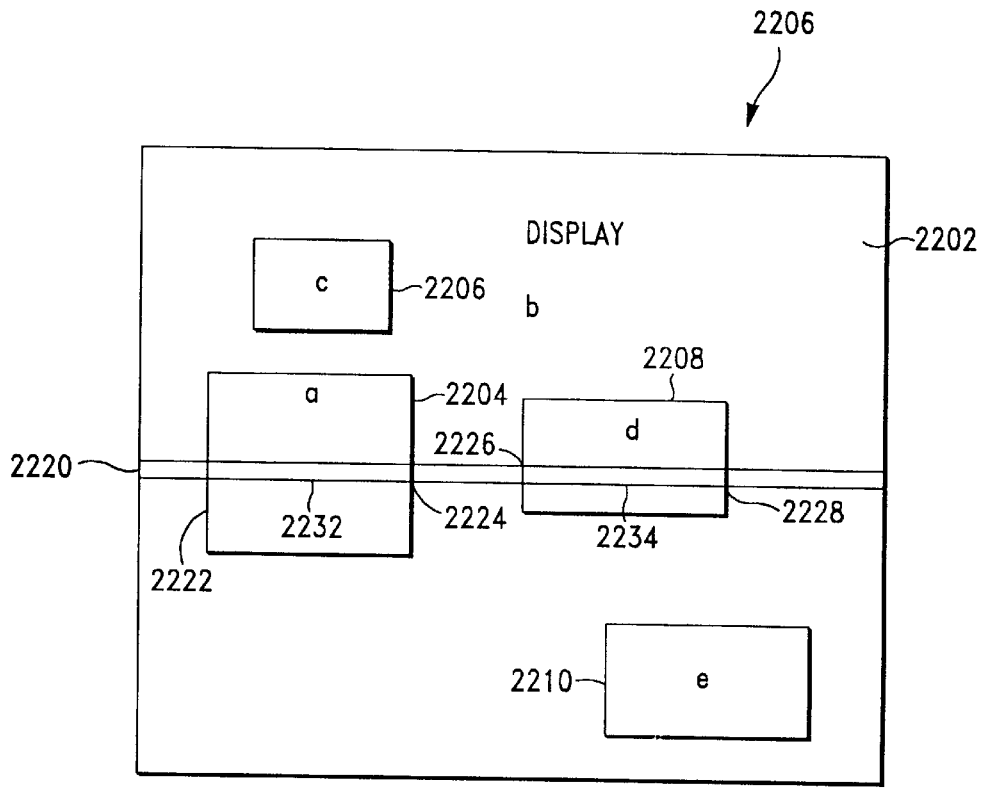
FIG. 22 illustrates a scan line used in the creation of a display.

An overview of the operation of overlay mux 2110 is described with reference to FIG. 22. FIG. 22 illustrates a scan line 2220 used in the creation of display 2200. Scan line 2220 is generated by overlay mux 2110 and includes display data associated with background display 2202, "a" overlay data 2204, and "d" overlay data 2208. In normal operation, the data stream from display FIFO pipeline 2104 is used to draw the background display 2202 in raster fashion (i.e., scan line by scan line). This data stream is generated by display FIFO pipeline 2104 and originates in background portion 1962 of graphics memory 1960.

However, when CRTC 2108 determines that one or more overlay strips 2232, 2234 are present within the current scan line, CRTC 2108 instructs overlay FIFO pipeline 2106 to download overlay data from graphics memory 1960. In the context of scan line 2220, CRTC 2108 instructs overlay FIFO pipeline 2106 to first download "A" overlay display data 2062 from graphics memory 1960. After format conversion and associated processing (e.g., scaling), data for "a" overlay strip 2232 is produced and sent to overlay mux 2110 via path 2126. The data for "a" overlay strip 2232 is selected by overlay mux 2110 when point 2222 of scan line 2220 is reached. When point 2224 of scan line 2220 is reached, overlay mux 2110 resumes the normal routine of passing background display data to display 14/24.

As further illustrated in FIG. 22, scan line 2220 also includes "d" overlay strip 2234. In a similar fashion, CRTC 2108 instructs overlay FIFO pipeline 2106 to download "D" overlay display data 2068 from graphics memory 1960. After format conversion, data for "d" overlay strip 2234 is produced and sent to overlay mux 2110 via path 2126. The data for "d" overlay strip 2234 is selected by overlay mux 2110 when point 2226 of scan line 2220 is reached. When point 2228 is reached, overlay mux 2110 resumes passing background display data to display 14/24. This process of selecting between background display data 2202 and overlay display data 2204, 2206, 2208, or 2210 is repeated for each scan line 2220 in display 2200.

As noted in the example display of FIG. 22, multiple overlays are supported by the present invention. The number of possible overlays is implementation dependent. Generally, in the hardware architecture of the present invention, each overlay is assigned a set of overlay registers. The overlay registers defined in Table 1 are described with reference to FIG. 23.

Figure 23:
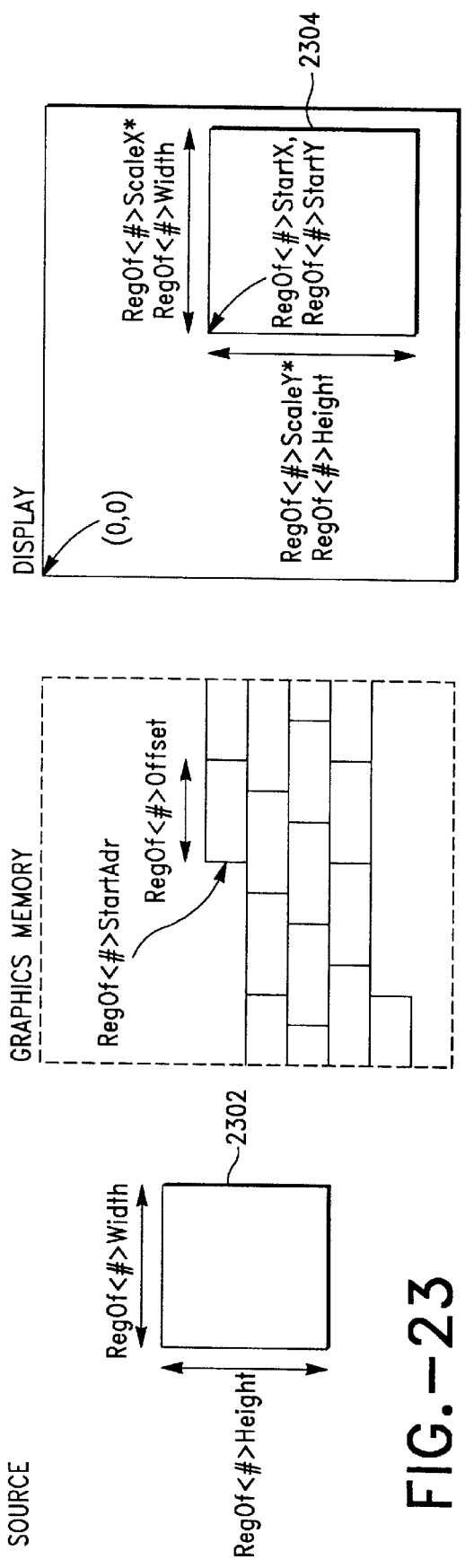
FIG. 23 illustrates the meaning of register values assigned to each overlay.

As shown in FIG. 23, the registers RegOf<#>Height and RegOf<#>Width contain the dimensions of unscaled overlay image 2302 that is output by one of sources 2002, 2004, 2006, and 2008. After unscaled overlay image 2302 data is downloaded to overlay FIFO pipeline 2106, interpolation and scaling unit 2806 can adjust the dimensions of unscaled overlay image 2302 based upon the values of registers RegOf<#>ScaleX and RegOf<#>ScaleY. Specifically, the dimensions of scaled overlay image 2304 on display 14/24 are generated through a multiplication of the dimensions of unscaled overlay image 2302 with scale factors ScaleX and ScaleY. Further with respect to scaled overlay image 2304, the position on display 14/24 is defined by an origin (e.g., top left hand corner). The X,Y coordinates of this origin point are defined by registers RegOf<#>StartX and RegOf<#>StartY.

TABLE 1

| RegOf<#>En | When set to one, this bit indicates that the overlay is to be displayed |
|---|---|
| RegOf<#>Height | Height of the unscaled overlay in pixel units |
| RegOf<#>Width | Width of the unscaled overlay in pixel units |
| RegOf<#>StartAdr | Memory address that locates the start of the overlay in graphics memory |
| RegOf<#>Offset | Defines the address offset between lines of the overlay. Address of the first pixel of line n of overlay <#> = RegOf<#>StartAdr + (n * RegOf<#>Offset) |
| RegOf<#>StartX | X coordinate that defines the horizontal position of the origin of the overlay in the display. |
| RegOf<#>StartY | Y coordinate that defines the vertical position of the origin of the overlay in the display. |
| RegOf<#>ScaleX | Scale factor applied in the horizontal direction to stretch the overlay image on the display. ScaleX*Width determines the overall display width. A zero value is treated the same as a value of one. |
| RegOf<#>ScaleY | Scale factor applied in the vertical direction to stretch the overlay image on the display. ScaleY*Height determines the overall display height. A zero value is treated the same as a value of one. |
| RegOf<#>ClrFmt | Defines the native format of the display (e.g., MPEG, YUV, etc.) |

"#" = Register Number
"*" = multiplication

Finally, the positioning of unscaled overlay image 2302 data in graphics memory 1960 is defined by a start address in register RegOf<#>StartAdr. The register RegOf<#>Offset defines the address offset between lines of unscaled overlay image 2302. Specifically, the address of the first pixel of line n of overlay<#>=RegOf<#>StartAdr+(n * RegOf<#>Offset). Through these calculations, overlay FIFO pipeline 2106 knows which data to download for a particular scan line.

Figure 24A:
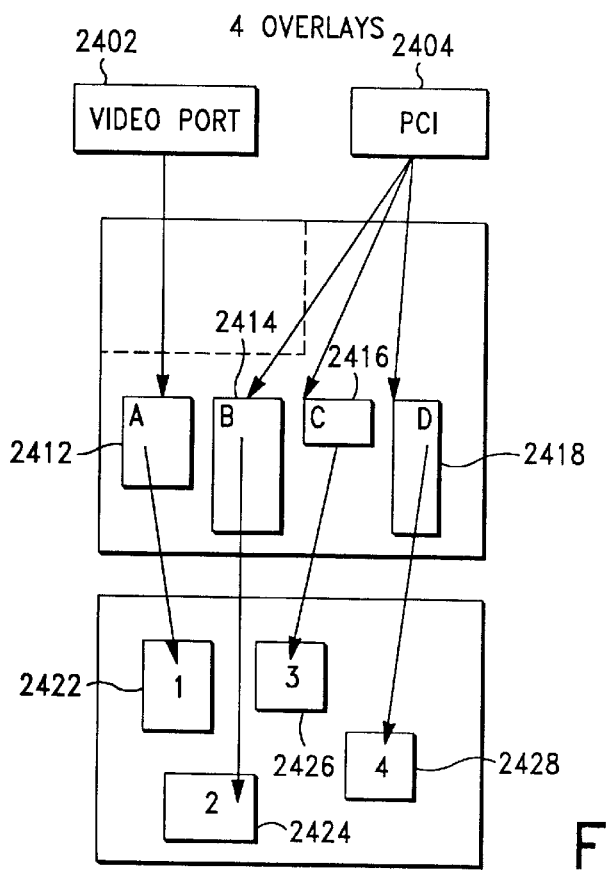
FIGS. 24A and 24B illustrate the assignment of registers in the performance of a double buffering function.
Figure 24B:
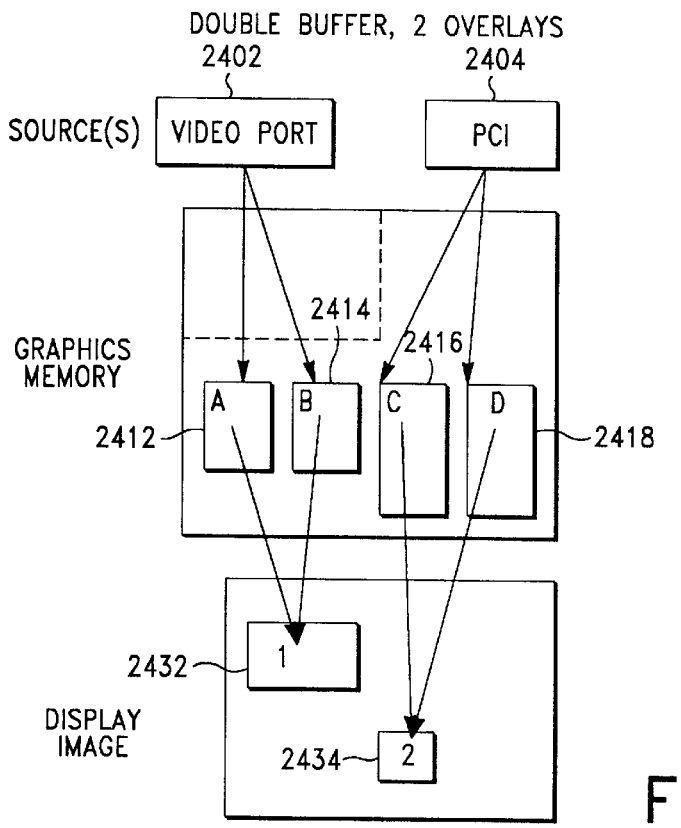

Through the use of the registers defined in Table 1, the present invention can easily support a double buffering function. As noted above, double buffering involves the use of two areas of memory for the display of a single overlay. In this process, an application alternates drawing between the first and second area of memory while the graphics controller alternates using the first and second area of memory as the source of the display. FIGS. 24A and 24B illustrate an exemplary register assignment that supports this function.

FIG. 24A illustrates a standard assignment of registers to overlays. Specifically, four overlays 2422, 2424, 2426, and 2428 originating from one of sources 2402, 2404 are each assigned a single register set (i.e., <#>=0, 1, 2, or 3). Table 2 illustrates possible register values for this particular register assignment.

TABLE 2

| <#> | En | StartX StartY | StartAdr | ScaleX Width | ScaleY Height |
|---|---|---|---|---|---|
| 0 | 1 | X1Y1 | A | SX1W1 | SY1H1 |
| 1 | 1 | X2Y2 | B | SX2W2 | SY2H2 |
| 2 | 1 | X3Y3 | C | SX3W3 | 5Y3H3 |
| 3 | 1 | X4Y4 | D | SX4W4 | SY4H4 |

As Table 2 illustrates, each enabled register set defines a unique X,Y start coordinate, start address, height, width, and scaling factors for overlay data stored in memory areas 2412, 2414, 2416, and 2418. Overlay data 2412, 2414, 2416, and 2418 in graphics memory 1960 has a one-to-one correspondence with overlays 2422, 24422, 2426, and 2428, respectively, on display 14/24.

FIG. 24B, on the other hand, illustrates an exemplary register assignment supporting the double buffering feature. Here, memory areas 2412 and 2414 correspond to overlay 2432 while memory areas 2416 and 2418 correspond to overlay 2434. By this dual assignment, sources 2402, 2404 can alternately write display data to one of the two memory areas associated with a single overlay. For example, source 2402 alternately writes to memory areas 2412 and 2414. In turn, memory areas 2412 and 2414 alternately act as a source for overlay 2432. Table 3 illustrates possible register values for this double buffering register assignment.

TABLE 3

| <#> | En | StartX StartY | StartAdr | ScaleX Width | ScaleY Height |
|---|---|---|---|---|---|
| 0 | ~a | X1Y1 | A | SX1W1 | SY1H1 |
| 1 | a | X1Y1 | B | SX1W1 | SY1H1 |
| 2 | b | X2Y2 | C | SX2W2 | SY2H2 |
| 3 | ~b | X2Y2 | D | SX2W2 | SY2H2 |

As Table 3 illustrates, the two complementary memory areas are identical in size as indicated by the identical register values for the X,Y start coordinate, height, width, and scaling factors. Since the two memory areas are distinct, each has a unique start address. With respect to the bit in the enable register, only one of the two complementary memory areas can be set at one time. In other words, only one of the memory areas can act as a source of the display at any particular time.

Further with respect to register assignments, one embodiment of the present invention assigns registers to overlays based upon the proximity of the overlays on the display. Specifically, if two or more overlays are displayed, the left most overlay is programmed into the lowest overlay register set. For example, if four overlays are displayed, the left most overlay is assigned register set 0, the middle left overlay is assigned register set 1, the middle right overlay is assigned register set 2, and the right most overlay is assigned register set 3. These assignments can be based on the value of register RegOf<#>StartX for each of the overlays.

Generally, this assignment methodology can reduce the amount of CRTC 2108 hardware processing that is required to determine which overlay data should be downloaded into overlay FIFO pipeline 2106 for a particular scan line. For example, consider the scenario where overlays are not allowed to overlap. In this scenario, CRTC 2108 first determines which overlays exist on a particular scan line. This determination is based solely on the Y-coordinate, height and the scaling factor. For the set of overlays that exist on this particular scan line, CRTC 2108 determines the order that overlay data is downloaded to overlay FIFO pipeline 2106. This order is based simply on the order of the register numbers.

For example, referring again to FIG. 22, consider scan line 2220 in display 2200 which includes "a" and "d" overlays 2204, 2208. Based upon the left-most positioning of the X start coordinate, "a" overlay 2204 is assigned register 0 and "d" overlay 2208 is assigned register 2. Based simply on this order of registers, CRTC 2108 knows that "a" overlay 2204 should be processed prior to "d" overlay 2208.

As one can readily appreciate, if overlapping overlays are permitted, CRTC 2108 requires additional software processing to determine the order that overlay FIFO pipeline 2106 downloads overlay data. In particular, as is well known to those of ordinary skill in the relevant art, overlapping overlays (or windows) are distinguishable based upon priority mechanisms that indicate the relative areas of screen ownership. Screen ownership considerations would thus supplement CRTC's use of coordinate register data.

Generally, as noted above, CRTC 2108 is the coordinator of graphics controller 2050. CRTC 2108 coordinates the functions of display FIFO pipeline 2104 and overlay FIFO pipeline 2106. More specifically, CRTC 2108 functions include the coordination of (1) when display FIFO pipeline 2104 and overlay FIFO pipeline 2106 should read in background and overlay data, respectively, and (2) when display FIFO pipeline 2104 and overlay FIFO pipeline 2106 should begin processing downloaded data. CRTC 2108 functions also include the coordination of which display data (background or overlay) overlay mux 2110 should select.

Figure 25:
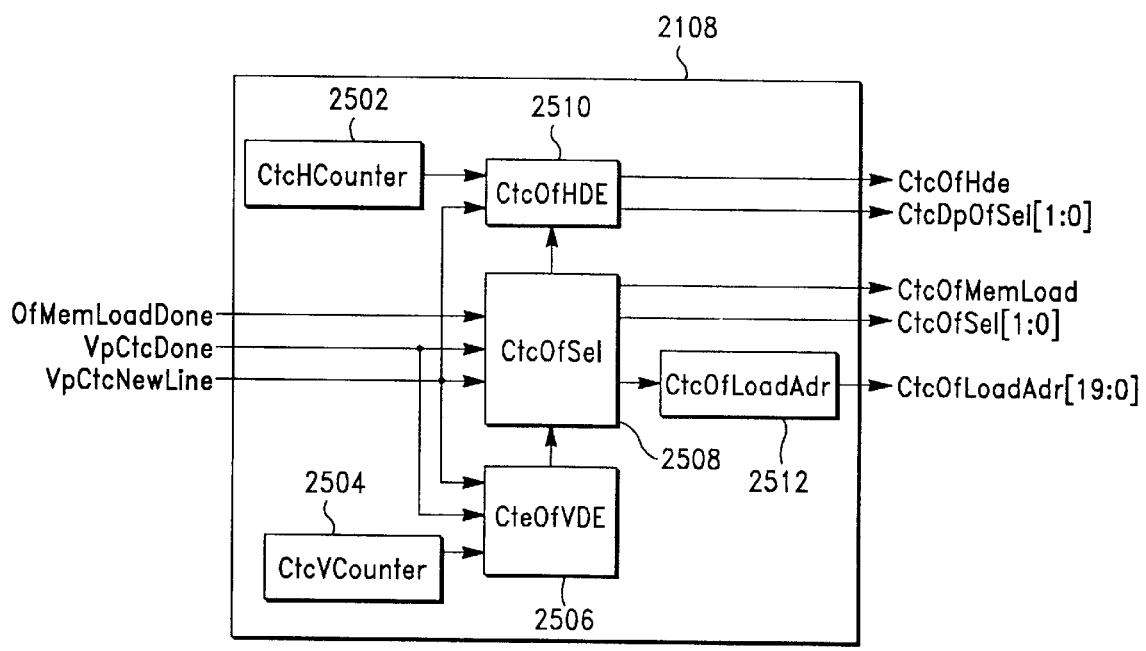
FIG. 25 illustrates an embodiment of the control part of the graphics controller.

FIG. 25 illustrates a high-level block diagram of a control part of CRTC 2108. The foundation of CRTC 2108 is two counters, horizontal counter 2502 and vertical counter 2504 that are triggered upon the beginning of each new display frame. The values of counters 2502, 2504 represent the coordinates of the display. These coordinates are generated with reference to an origin (e.g., top left hand corner).

Figure 26:
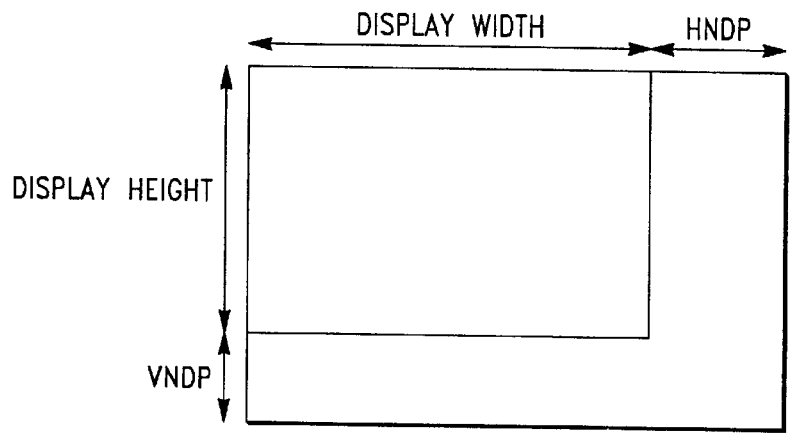
FIG. 26 illustrates the non-display areas identified by horizontal and vertical counters.

As illustrated in FIG. 26, the horizontal counter 2502 and vertical counter 2504 also identify coordinates of non-displayed areas. The coordinates of these non-displayed areas are referred to as a horizontal non-displayed period (HNDP) and a vertical non-displayed period (VNDP). Horizontal counter 2502 thus counts from zero on every line and is incremented for each successive pixel until the width of the display plus the HNDP margin is reached. Likewise, vertical counter 2504 counts from zero for the first scan line and is incremented for each successive scan line until the height of the display plus the VNDP margin is reached.

Generally, before the start of any line not within the VNDP, CRTC 2108 instructs display FIFO pipeline 2104 to begin reading in background graphics data. When horizontal counter 2502 is not in the HNDP, CRTC 2108 instructs display FIFO pipeline 2104 to process the background graphics data. CRTC 2108 must provide sufficient time for display FIFO pipeline 2104 to load background data before processing can occur.

With respect to overlay FIFO pipeline 2106, similar principles are used. Prior to display of a particular overlay, CRTC 2108 must instruct overlay FIFO pipeline 2106 to read in specific overlay data. Shortly thereafter, CRTC 2108 instructs overlay FIFO pipeline 2106 to start preparing overlay data for fmal display. In the context of scan line 2220 of FIG. 22, CRTC first instructs overlay FIFO pipeline 2106 to read data for overlay "a" 2204. CRTC 2108 cannot instruct overlay FIFO pipeline 2106 to read data for overlay "d" 2208 until overlay FIFO pipeline 2106 informs CRTC 2108 that overlay scan line 2232 has been completely read in. In a preferred embodiment, this coordination between processing of multiple overlays is facilitated by bidirectional handshaking. Specifically, overlay FIFO pipeline 2106 sends to CRTC 2108 an OfMemLoadDone signal that indicates that overlay FIFO pipeline 2106 has fiished reading an entire overlay line, and that it is ready to accept a request to begin reading the next overlay line.

Bidirectional handshaking is also used to accommodate the overlay scaling feature of overlay FIFO pipeline 2106. For example, assume that overlay FIFO pipeline 2106 has overlay data that requires horizontal enlargement. Since the scaling is performed within overlay FIFO pipeline 2106, CRTC 2108 cannot determine in advance the final overlay image dimension. Thus, at the end of each overlay line drawn, overlay FIFO pipeline 2106 provides CRTC 2108 with a VpCTCDone signal that indicates that processing of the last pixel in the overlay line is complete. Similarly, with respect to vertical enlargement, overlay FIFO pipeline 2106 provides CRTC 2108 with a VpCTCNewLine signal that indicates whether it requires the same overlay line or a new overlay line of the unscaled overlay image the next time the overlay is to be drawn.

As illustrated by FIG. 25, these handshaking signals OfMemLoadDone, VpCTCDone, and VpCTCNewLine are provided as inputs to CRTC 2108. The operation of the rest of the control part of CRTC 2108 is now described.

As noted above, CtcVCounter 2504 provides a vertical coordinate for a particular scan line. This vertical coordinate is provided to CtcOfVDE 2506. CtcOfVDE 2506 generates a vertical display enable signal for each of the overlays. Specifically, signals CtcOf<#>VDE provided to CtcOfSel 2508, when active high, indicate that overlay<#> is visible on the scan line currently being drawn. In the example of scan line 2220 of FIG. 22, CtcOf<0>VDE and CtcOf<2>VDE are active high and CtcOf<1>VDE and CtcOf<3>VDE are inactive low.

Upon receipt of the CtcOf<#>VDE signals, CtcOfSel 2508 determines the order of overlays to be loaded into overlay FIFO pipeline 2106. If overlapping overlays are not permitted, this determination is simply the numeric order of enabled overlays. For scan line 2220, the overlay "0" is loaded first and overlay "2" is loaded second. As noted above, if overlapping overlays are permitted, this determination may require more complex hardware processing that considers the relative priority of screen ownership on that scan line.

To facilitate the bidirectional handshaking, CtcOfSel 2508 outputs signals CtcOfMemLoad and CtcOfSel. CtcOfMemLoad instructs overlay FIFO pipeline 2106 to begin reading in overlay data from memory. CtcOfSel define the particular overlay that overlay FIFO pipeline 2106 reads in from memory. Additionally, CtcOfLoadAdr 2512 outputs CtcOfLoadAdr which define the starting address of the overlay to be read in from memory.

Based on the order of overlays to be processed, CtcOf-HDE determines when overlay FIFO pipeline should begin preparing overlay data for fmal display. Based upon input from CtcHCounter 2502, CtcOfHDE 2510 outputs CtcOf-Hde which informs overlay FIFO pipeline 2106 when to begin processing the overlay data. CtcOfHDE 2510 also outputs CtcDpOfSel which defines the current overlay being prepared.

As described, CtcOfMemLoad, CtcOfSel, CtcOfLoadAdr, and OfMemLoadDone are all signals related to the reading of data from memory into overlay FIFO pipeline 2108. CtcOfHde, CtcDpOfSel, VpCtcDone, and VpCtcNewLine, on the other hand, are signals related to the processing of the overlay data. An example of the interaction between these signals is illustrated in the timing diagram of FIG. 27.

Figure 27:
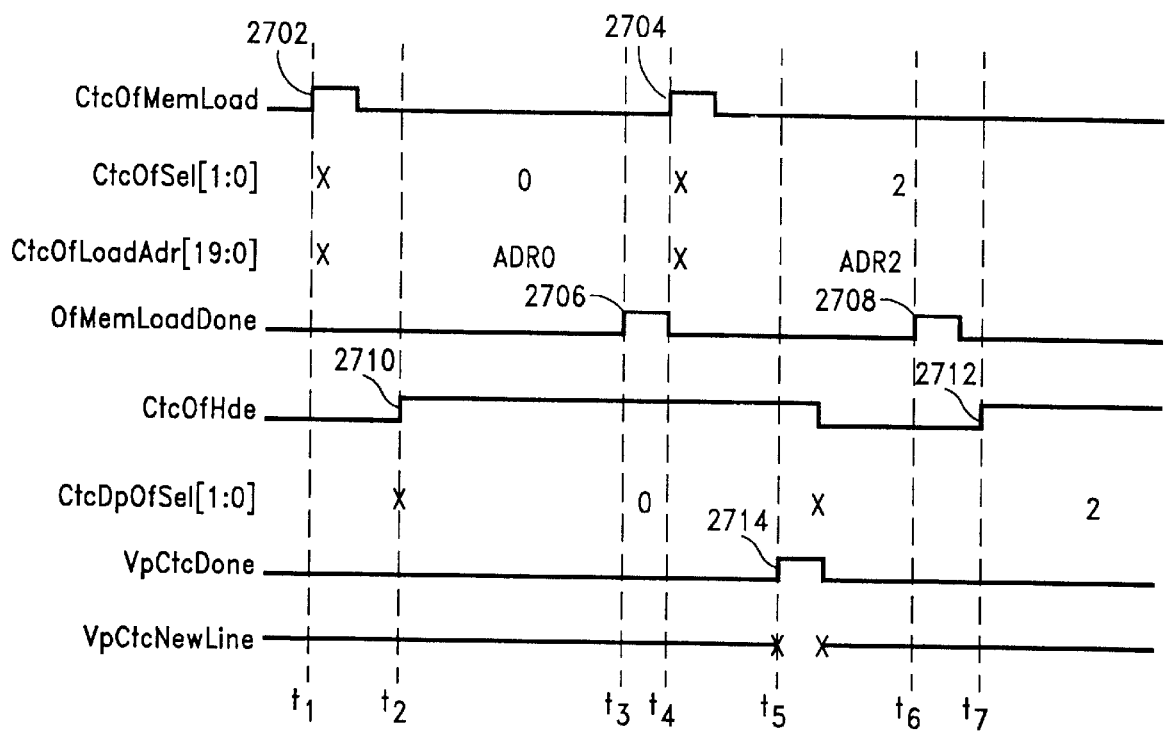
FIG. 27 illustrates a timing diagram of control signals between the controller and the overlay FIFO pipeline.

Generally, the assertion of CtcOfMemLoad occurs before a rising edge of CtcOfHde. In other words, overlay data is loaded prior to being processed. In FIG. 27, the time delay between rising edge 2702 at time $t_1$ and rising edge 2710 at time $t_2$ as well as the time delay between rising edge 2704 at time $t_6$ and rising edge 2712 at time $t_7$ is of sufficient duration to allow overlay FIFO pipeline 2106 to read in the first data of the specified overlay from graphics memory 1960.

As indicated by CtcOfSel, the specified overlay for the first load is overlay "0", and the specified overlay for the second load is overlay "2". The start addresses are specified by CtcOfLoadAdr as ADR0 and ADR2, respectively.

As noted above, the processing of overlay data begins with the assertion of CtcOfHde. For overlay "0", processing begins at rising edge 2710 at time $t_2$. For overlay "2", processing begins at rising edge 2712 at time $t_7$. It should also be noted that VpCtcDone generally occurs after OfMemLoadDone. Specifically, rising edge 2714 at time $t_5$ generally occurs after rising edge 2706 at time $t_3$. If rising edge 2714 occurs prior to rising edge 2706, the last overlay pixel may have been drawn prior to overlay FIFO pipeline 2106 reading in the entire overlay line. A catastrophic FIFO underflow condition may therefore have occurred.

While the invention has been particularly shown and described with reference to preferred embodiments thereof, it will be understood by those skilled in the relevant art that various changes in form and details may be made therein without departing from the spirit and scope of the invention.

What is claimed is:

1. In a computer system having a graphics memory that stores background graphics display data and overlay data, a graphics controller, comprising:

a display FIFO pipeline that reads in the background graphics display data from the graphics memory;

an overlay FIFO pipeline that reads in the overlay display data from said graphics memory, wherein the overlay display data is stored in an off-screen part of the graphics memory in a format native to a source that produces the overlay display data;

an overlay mux that selectively outputs, for a current scan line, one of the background graphics data display and the overlay display data to a display;

a vertical counter;

a vertical display enable unit coupled to said vertical counter, said vertical display enable unit determining whether a subset of overlays are visible on said current scan line;

an overlay select unit coupled to said vertical display enable unit, said overlay select unit determining an order that overlay data for said subset of overlays is written to said overlay FIFO pipeline, said overlay select unit sending memory load, overlay select, and start address signals to said overlay FIFO pipeline; and a horizontal display enable unit coupled to said overlay select unit, said horizontal display enable unit instructing said overlay FIFO pipeline when to begin processing of said overlay display data.

2. The controller of claim 1, wherein said overlay FIFO pipeline comprises:

a FIFO that receives the overlay display data from said off-screen part of the graphics memory; and a format converter that converts the overlay display data from said format native to said source that produces the overlay display data into a format capable of being displayed by said display.

3. The controller of claim 2, wherein said overlay FIFO pipeline further comprises a unit coupled to said format converter that scales the overlay display data.

4. The controller of claim 2, wherein said overlay FIFO pipeline further comprises a unit coupled to said format converter that interpolates the overlay display data.

5. The controller of claim 1, further comprising a priority logic unit for arbitrating memory access requests to said graphics memory using a multi-tiered approach, wherein upper tier memory access requests can interrupt existing lower tier memory access requests.

6. A method for processing overlay display data, comprising the steps of:

(1) storing overlay display data in an off-screen part of a graphics memory, wherein said overlay display data is stored in a format native to at least one source;

(2) retrieving, by a display FIFO pipeline, background graphics display data from an on-screen part of said graphics memory;

(3) retrieving, by an overlay FIFO pipeline, overlay display data for a source;

(4) converting, by said overlay FIFO pipeline, said retrieved overlay display data into a format capable of being displayed by a display;

(5) sending, by an overlay mux, one of said background graphics display data and said converted overlay display data to said display;

(6) determining which overlay display data is visible on a current scan line;

(7) determining an order that said overlay FIFO pipeline reads overlay display data out of said graphics memory; and wherein said step (7) comprises the step of determining said order based upon a relative assignment of registers.

7. A method for processing double buffered overlay display data, comprising the steps of:

(1) alternately storing overlay display data in one of two off-screen parts of a graphics memory, wherein said overlay display data is stored in a format native to a source; and (2) alternately retrieving, by an overlay FIFO pipeline, said overlay display data from one of said two off-screen parts of said graphics memory, wherein said step of alternately retrieving is based upon a complementary relation of enable bit registers that are associated with said two off-screen parts of said graphics memory.

8. A computer system, comprising:

a microprocessor;

a data bus coupled to said microprocessor a graphics memory that stores background graphics display data and overlay data, wherein said overlay display data is stored in an off-screen part of said graphics memory in a format native to a source that produces said overlay display data; and a graphics controller coupled to said data bus, said graphics controller comprising:

a display FIFO pipeline that reads in said background graphics display data from said graphics memory;

an overly FIFO pipeline that reads in said overlay display data from said graphics memory; and an overlay mux that selectively outputs, for a current scan line, one of said background graphics display data and said overlay display data to be used by a display; and a control unit, said control unit comprising:

a vertical display enable unit coupled to said vertical counter, said vertical display enable unit determining whether a subset of overlays are visible on said current scan line;

an overlay select unit coupled to said vertical display enable unit, said overlay select unit determining an order that overlay data for said subset of overlays is written to said overlay FIFO pipeline, said overlay select unit sending memory load, overlay select, and start address signals to said overlay FIFO pipeline; and a horizontal display enable unit coupled to said overlay select unit, said horizontal display enable unit instructing said overlay FIFO pipeline when to begin processing of said overlay display data.

9. The computer system of claim 8, wherein said overlay FIFO pipeline comprises:

a FIFO that receives the overlay display data from said off-screen part of the graphics memory; and a format converter that converts the overlay display data from said format native to said source that produces the overlay display data into a format capable of being displayed by said display.

10. The computer system of claim 9, wherein said overlay FIFO pipeline further comprises a unit coupled to said format converter that scales the overlay display data.

11. The computer system of claim 9, wherein said overlay FIFO pipeline frtther comprises a unit coupled to said format converter that interpolates the overlay display data.

12. The computer system of claim 8, further comprising a priority logic unit for arbitrating memory access requests to said graphics memory using a multi-tiered approach, wherein upper tier memory access requests can interrupt existing lower tier memory access requests.

13. The computer system of claim 8, wherein said overlay mux outputs display data to a TV converter, said TV converter coupled to said display.

14. The computer system of claim 8, wherein said overlay mux outputs display data to a LCD interface, said LCD interface coupled to said display.

15. The computer system of claim 8, wherein said overlay mux outputs display data to a digital-to-analog converter, said digital-to-analog converter coupled to said display.

* * * * *

UNITED STATES PATENT AND TRADEMARK OFFICE
CERTIFICATE OF CORRECTION

PATENT NO.    : 5,877,741
DATED         : March 02, 1999
INVENTOR(S)   : Lawrence Chee, et al.

It is certified that errors appear in the above identified patent and that said Letters Patent is hereby corrected as shown below:

Column 27, line 13, change "overly" to --overlay--.

Signed and Sealed this

Tenth Day of August, 1999

Attest:

Q. TODD DICKINSON

*Attesting Officer*            *Acting Commissioner of Patents and Trademarks*